US009048959B2

(12) United States Patent
Voutilainen et al.

(10) Patent No.: US 9,048,959 B2
(45) Date of Patent: Jun. 2, 2015

(54) METHOD AND APPARATUS FOR A WIRELESS OPTICAL LINK

(71) Applicant: Nokia Corporation, Espoo (FI)

(72) Inventors: Martti Voutilainen, Espoo (FI); Riku Suomela, Espoo (FI)

(73) Assignee: Nokia Corporation, Espoo (FI)

( * ) Notice: Subject to any disclaimer, the term of this patent is extended or adjusted under 35 U.S.C. 154(b) by 154 days.

(21) Appl. No.: 13/624,435

(22) Filed: Sep. 21, 2012

(65) Prior Publication Data
US 2014/0086586 A1    Mar. 27, 2014

(51) Int. Cl.
*H04B 10/00* (2013.01)
*H04B 10/04* (2006.01)
*H04B 10/06* (2006.01)
*H04B 10/80* (2013.01)
*H04M 1/00* (2006.01)
*H04B 5/00* (2006.01)
*H04B 10/114* (2013.01)
*H04M 1/725* (2006.01)

(52) U.S. Cl.
CPC ............ *H04B 10/801* (2013.01); *H04B 5/0037* (2013.01); *H04B 10/1143* (2013.01); *H04B 10/806* (2013.01); *H04M 1/003* (2013.01); *H04M 1/72527* (2013.01); *H04M 2250/04* (2013.01)

(58) Field of Classification Search
None
See application file for complete search history.

(56) References Cited

U.S. PATENT DOCUMENTS

| | | | | |
|---|---|---|---|---|
| 4,956,877 | A * | 9/1990 | Kroll et al. | 398/170 |
| 7,421,163 | B1 * | 9/2008 | Tong et al. | 385/37 |
| 8,149,758 | B2 * | 4/2012 | Shoji | 370/315 |
| 8,351,793 | B2 * | 1/2013 | Chui et al. | 398/130 |
| 8,515,294 | B2 * | 8/2013 | Britz et al. | 398/212 |
| 2009/0221240 | A1 * | 9/2009 | Zhang | 455/68 |
| 2011/0057606 | A1 * | 3/2011 | Saunamaki | 320/108 |
| 2011/0225073 | A1 * | 9/2011 | Won et al. | 705/30 |
| 2013/0082937 | A1 * | 4/2013 | Liu et al. | 345/173 |
| 2013/0084800 | A1 * | 4/2013 | Troberg et al. | 455/41.1 |
| 2013/0183030 | A1 * | 7/2013 | Duis et al. | 398/25 |
| 2013/0236192 | A1 * | 9/2013 | Deicke et al. | 398/135 |

OTHER PUBLICATIONS

A. Paraskevopoulos, et al.; Optical Wireless Communication Systems in the Mb/s to Gb/s Range, Suitable for Industrial Applications; IEEE/ASME Transactions on Mechatronics [IEEE/ASME Trans. Mechatron.]. vol. 15, No. 4, pp. 541-547. Aug. 2010.
http://www.photonicsonline.com/product.mvc/Custom-Coatings-for-Avionics-Displays 0001?sectionCode=Spotlight&templateCode=EnhancedStandard&user=20&source=nl:31022.

* cited by examiner

*Primary Examiner* — Ken Vanderpuye
*Assistant Examiner* — Jai Lee
(74) *Attorney, Agent, or Firm* — Locke Lord LLP

(57) ABSTRACT

Example method, apparatus, and system embodiments are disclosed to provide a high data throughput optical communication link. An example embodiment comprises: a high frequency optical receiver configured to receive signals modulated with high frequency data; an optical waveguide having a receiving portion and a transmitting portion juxtaposed with the receiver, configured to transfer signals incident on the receiving portion, to the transmitting portion, and to transmit the signals to the receiver; a guide portion configured to releasably engage another apparatus, for positioning the waveguide with respect to the other apparatus, to receive at the receiving portion of the waveguide, signals from the other apparatus, for delivery to the receiver; and a wireless power circuit configured to exchange wireless power with the other apparatus, to convert between electrical signals modulated with high frequency data and the optical signals modulated with high frequency data received by the waveguide.

11 Claims, 15 Drawing Sheets

FIG. 10A

OPERATIONAL STEPS IN THE
MOBILE DEVICE 18

1000

STEP 1002: POSITIONING, BY A GUIDE PORTION CONFIGURED TO RELEASABLY ENGAGE ANOTHER APPARATUS, AN OPTICAL WAVEGUIDE WITH RESPECT TO THE OTHER APPARATUS, TO RECEIVE AT A LIGHT RECEIVING PORTION OF THE OPTICAL WAVEGUIDE, OPTICAL SIGNALS FROM THE OTHER APPARATUS, MODULATED WITH HIGH FREQUENCY DATA, FOR DELIVERY TO A HIGH FREQUENCY OPTICAL RECEIVER;

STEP 1004: TRANSMITTING, BY A WIRELESS POWERING CIRCUIT, WIRELESS POWER TO THE OTHER APPARATUS, TO ENERGIZE A SOURCE OF THE OPTICAL SIGNALS MODULATED WITH HIGH FREQUENCY DATA TO BE RECEIVED BY THE OPTICAL WAVE GUIDE; AND

STEP 1006: TRANSFERRING, BY THE OPTICAL WAVEGUIDE, OPTICAL SIGNALS MODULATED WITH HIGH FREQUENCY DATA RECEIVED FROM THE OTHER APPARATUS AND INCIDENT ON THE LIGHT RECEIVING PORTION OF THE OPTICAL WAVE GUIDE, THE OPTICAL SIGNALS TRANSFERRED FROM THE LIGHT RECEIVING PORTION TO A LIGHT TRANSMITTING PORTION OF THE OPTICAL WAVE GUIDE, AND TRANSMITTING THE OPTICAL SIGNALS MODULATED WITH HIGH FREQUENCY DATA TO THE HIGH FREQUENCY OPTICAL RECEIVER.

FIG. 10B

OPERATIONAL STEPS IN THE OTHER DEVICE 114

1050

STEP 1052: POSITIONING, BY A GUIDE PORTION CONFIGURED TO RELEASABLY ENGAGE ANOTHER APPARATUS, AN OPTICAL WAVEGUIDE WITH RESPECT TO THE OTHER APPARATUS, TO RECEIVE AT A LIGHT RECEIVING PORTION OF THE OPTICAL WAVEGUIDE, OPTICAL SIGNALS FROM THE OTHER APPARATUS, MODULATED WITH HIGH FREQUENCY DATA, FOR DELIVERY TO A HIGH FREQUENCY OPTICAL RECEIVER;

STEP 1054: RECEIVING, BY A WIRELESS POWERED CIRCUIT, WIRELESS POWER FROM THE OTHER APPARATUS, TO ENERGIZE A DATA UTILIZATION DEVICE TO USE THE HIGH FREQUENCY DATA RECEIVED BY THE OPTICAL WAVE GUIDE; AND

STEP 1056: TRANSFERRING, BY THE OPTICAL WAVEGUIDE, OPTICAL SIGNALS MODULATED WITH HIGH FREQUENCY DATA RECEIVED FROM THE OTHER APPARATUS AND INCIDENT ON THE LIGHT RECEIVING PORTION OF THE OPTICAL WAVE GUIDE, THE OPTICAL SIGNALS TRANSFERRED FROM THE LIGHT RECEIVING PORTION TO A LIGHT TRANSMITTING PORTION OF THE OPTICAL WAVE GUIDE, AND TRANSMITTING THE OPTICAL SIGNALS MODULATED WITH HIGH FREQUENCY DATA TO THE HIGH FREQUENCY OPTICAL RECEIVER, TO PROVIDE THE HIGH FREQUENCY DATA TO THE UTILIZATION DEVICE.

METHOD AND APPARATUS FOR A WIRELESS OPTICAL LINK

FIELD

The field of the invention relates to wireless communication, and more particularly to providing a high data throughput optical communication link.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other short-range communication technologies include Bluetooth™ Low Energy, IEEE 802.11 wireless local area network (WLAN), Wireless USB, ZigBee (IEEE 802.15.4, IEEE 802.15.4a), and ultra-high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as Bluetooth™ or wireless local area network (WLAN).

SUMMARY

Example embodiments are disclosed to provide a high data throughput optical communication link.

An example embodiment of the invention includes an apparatus comprising:
a high frequency optical receiver configured to receive optical signals modulated with high frequency data;
an optical waveguide having a light receiving portion and a light transmitting portion juxtaposed with the high frequency optical receiver, configured to transfer optical signals modulated with high frequency data incident on the light receiving portion, from the light receiving portion to the light transmitting portion, and to transmit the optical signals modulated with high frequency data to the high frequency optical receiver;
a guide portion configured to releasably engage another apparatus, for positioning the optical waveguide with respect to the other apparatus, to receive at the light receiving portion of the optical waveguide, optical signals from the other apparatus, modulated with high frequency data, for delivery to the high frequency optical receiver; and
a wireless power circuit configured to exchange wireless power with the other apparatus, to convert between electrical signals modulated with high frequency data and the optical signals modulated with high frequency data received by the optical waveguide.

An example embodiment of the invention includes an apparatus comprising:
wherein the wireless power circuit is a wireless powering circuit configured to transmit wireless power to the other apparatus, to energize a source of the optical signals modulated with high frequency data received by the optical wave guide.

An example embodiment of the invention includes an apparatus comprising:
a data utilization device in the apparatus; and
wherein the wireless power circuit is a wireless powered circuit configured to receive wireless power from the other apparatus, to energize the data utilization device to use the high frequency data that modulates the optical signals received by the optical wave guide.

An example embodiment of the invention includes an apparatus comprising:
a proximity detector coupled to the wireless powering circuit, configured to generate a triggering signal when the apparatus and the other apparatus are brought within proximity of each other;
wherein the triggering signal causes the wireless powering circuit to transmit wireless power to the other apparatus.

An example embodiment of the invention includes an apparatus comprising:
a proximity detector coupled to the guide portion and to the wireless powering circuit, configured to generate a triggering signal when the guide portion is releasably engaged with the other apparatus;
wherein the triggering signal causes the wireless powering circuit to transmit wireless power to the other apparatus.

An example embodiment of the invention includes an apparatus comprising:
wherein the guide portion positioning the waveguide comprises at least one of magnets, adhesive, and mechanical guides.

An example embodiment of the invention includes an apparatus comprising:
wherein the other apparatus comprises at least one of a stationary device, a mobile device, a mobile radio device, a display device, a storage device, an accessory device, and an attachment device.

An example embodiment of the invention includes a method comprising:

positioning, by a guide portion configured to releasably engage another apparatus, an optical waveguide with respect to the other apparatus, to receive at a light receiving portion of the optical waveguide, optical signals from the other apparatus, modulated with high frequency data, for delivery to a high frequency optical receiver;

transmitting, by a wireless powering circuit, wireless power to the other apparatus, to energize a source of the optical signals modulated with high frequency data to be received by the optical wave guide; and transferring, by the optical waveguide, optical signals modulated with high frequency data received from the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver.

An example embodiment of the invention includes a method comprising:

generating, by a proximity detector, a triggering signal when the guide portion is releasably engaged with the other apparatus, to cause the wireless powering circuit to transmit wireless power to the other apparatus.

An example embodiment of the invention includes a method comprising:

positioning, by a guide portion configured to releasably engage another apparatus, an optical waveguide with respect to the other apparatus, to receive at a light receiving portion of the optical waveguide, optical signals from the other apparatus, modulated with high frequency data, for delivery to a high frequency optical receiver;

receiving, by a wireless powered circuit, wireless power from the other apparatus, to energize a data utilization device to use the high frequency data received by the optical wave guide; and transferring, by the optical waveguide, optical signals modulated with high frequency data received from the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver, to provide the high frequency data to the utilization device.

An example embodiment of the invention includes a method comprising:

generating, by a proximity detector, a triggering signal when the guide portion is releasably engaged with the other apparatus, to cause the wireless powered circuit to receive wireless power from the other apparatus.

An example embodiment of the invention includes an apparatus comprising:

an optical waveguide positioned to receive high frequency optical signals from an external transmitter, the optical waveguide including a guide portion providing positioning with respect to the external high frequency optical transmitter;

a band pass optical filter coating on a first side of the optical waveguide, to pass the optical signals into the optical waveguide as filtered optical signals;

a first reflecting surface on a second side of the optical waveguide, configured to reflect the filtered optical signals within the optical waveguide, into total internally reflected optical signals that propagate in a generally longitudinal direction within the optical waveguide; and a second reflecting surface located at a longitudinal distance within the optical waveguide from the first reflecting surface, configured to reflect the total internally reflected optical signals through the second side and out of the optical waveguide, to be incident on an external high frequency optical receiver.

An example embodiment of the invention includes an apparatus comprising:

wherein the high frequency optical receiver is in a mobile radio device and the high frequency optical signals are from a second device configured to communicate via the optical wave guide, with the mobile radio device.

An example embodiment of the invention includes an apparatus comprising:

wherein the first reflecting surface comprises at least one of a reflector array and an array of reflective microdots.

An example embodiment of the invention includes an apparatus comprising:

wherein the second reflecting surface comprises a reflective conical surface.

An example embodiment of the invention includes an apparatus comprising:

a wireless powering circuit associated with the optical waveguide, configured to transmit wireless power to energize the external high frequency optical transmitter of the optical signals received by the optical wave guide.

An example embodiment of the invention includes a system comprising:

a first optical waveguide, positioned on a mobile radio device having a first high frequency optical receiver, the first waveguide having a first guide portion;

a second optical waveguide, positioned on another device having a second high frequency optical receiver, the second waveguide being releasably positioned by means of a second guide portion configured to engage with the first guide portion of the first wave guide;

a first high frequency optical transmitter of the mobile radio device, configured to transmit first optical signals into the second optical waveguide to illuminate the second high frequency optical receiver of the other device; and a second high frequency optical transmitter of the other device, configured to transmit second optical signals into the first optical waveguide to illuminate the first high frequency optical receiver of the mobile radio device.

An example embodiment of the invention includes a system comprising:

a first near field communications circuit in the mobile radio device;

a second near field communications circuit in the other device;

the first near field communication circuit generating a first triggering signal and the second near field communication circuit generating a first triggering signal when the first and second near field communication circuits are brought within a touch proximity of each other;

wherein the first triggering signal causes the first high frequency optical transmitter of the mobile radio device, to transmit the first optical signals into the second optical waveguide to illuminate the second high frequency optical receiver of the other device; and wherein the second triggering signal causes the second high frequency optical transmitter of the other device, to transmit the second optical signals into the first optical waveguide to illuminate the first high frequency optical receiver of the mobile radio device.

An example embodiment of the invention includes a system comprising:

a power source in the mobile radio device;

a wirelessly powered data utilization device in the other device;

a first near field communications circuit in the mobile radio device coupled to the power source;

a second near field communications circuit in the other device coupled to the data utilization device that is coupled to the second high frequency optical transmitter of the other device;

the first near field communication circuit generating a first triggering signal and the second near field communication circuit generating a second triggering signal when the first and second near field communication circuit are brought within a touch proximity of each other;

wherein the first triggering signal causes the first near field communications circuit in the mobile radio device to transmit wireless power provided by the power source, to the second near field communications circuit in the other device and the second triggering signal causes the second near field communications circuit to provide power derived from the wireless power, to the data utilization device in the other device; and wherein the data utilization device outputs data to the second high frequency optical transmitter of the other device, in response to the derived power, to transmit second optical signals modulated with the output data into the first optical waveguide to illuminate the first high frequency optical receiver of the mobile radio device.

An example embodiment of the invention includes a system comprising:

wherein the first optical signals transmitted into the second optical waveguide describe a narrow cone of approximately ten degrees; and wherein the second optical signals transmitted into the first optical waveguide describe a narrow cone of approximately ten degrees.

An example embodiment of the invention includes a system comprising:

wherein the other device comprises a video camera attachment device that mounts on the mobile radio device by means of the first and second guide portions, enabling video data to be transferred to the mobile radio device from the video camera attachment device via the first and second optical wave guides.

An example embodiment of the invention includes a system comprising:

a first optical waveguide having upper and lower planar surfaces mutually parallel to each other, positioned on a mobile radio device having a first high frequency optical receiver, the upper planar surface of the first waveguide having a first guide portion;

a second optical waveguide having upper and lower planar surfaces mutually parallel to each other, positioned on another device having a second high frequency optical receiver, the second waveguide being releasably positioned by means of a second guide portion configured to engage with the first guide portion of the first wave guide, with its lower planar surface in a spaced, parallel relationship with the upper planar surface of the first waveguide, as positioned by engagement of the first and second guide portions;

a first cone having an inner surface and hollow interior, and an outer surface, the first cone located within the first optical waveguide, with its apex proximate to the first optical receiver, the hollow interior of the first cone being open to the upper surface of the first waveguide, the hollow interior of the first cone containing a first high frequency optical transmitter of the mobile radio device, to transmit first optical signals into the second optical waveguide to illuminate the second high frequency optical receiver of the other device; and a second cone having an inner surface and hollow interior, and an outer surface, the second cone located within the second optical waveguide, with its apex proximate to the second optical receiver, the hollow interior of the second cone being open to the lower surface of the second waveguide, the hollow interior of the second cone containing a second high frequency optical transmitter of the other device, to transmit second optical signals into the first optical waveguide to illuminate the first high frequency optical receiver of the mobile radio device.

The resulting embodiments provide a high data throughput optical communication link.

DESCRIPTION OF THE FIGURES

FIG. 10A is an example flow diagram of operational steps in the mobile radio device of FIG. 9, according to an embodiment of the present invention.

FIG. 10B is an example flow diagram of operational steps in the other device 114 of FIG. 9, according to an embodiment of the present invention.

DISCUSSION OF EXAMPLE EMBODIMENTS OF THE INVENTION

The trend with mobile devices is to minimize or eliminate connectors and to transfer signal and power using wireless radio links and wireless power charging methods. The bandwidth requirement for data transfer between accessories, such as displays or storage and mobile radio device or between mobile radio devices, has increased dramatically.

In accordance with an embodiment of the invention, a high data throughput between a mobile radio device and another device, such as a stationary or mobile electronic device, is achieved with an optical communication link attached on the outer surface of the mobile device with releasable fasteners, such as self-adhesive surfaces or magnets. The positional accuracy is maintained between the mobile radio device and the other device while maintaining a high data throughput optical link.

Figure 1:
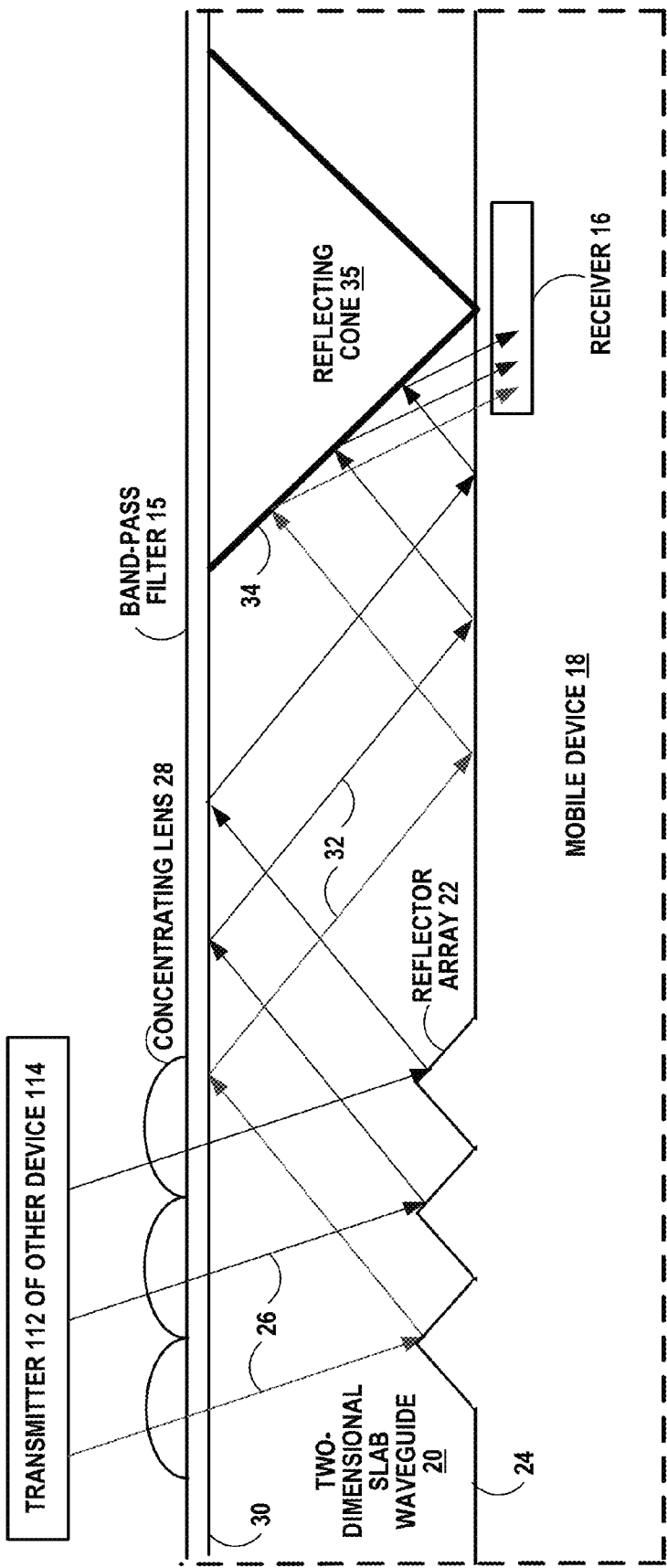
FIG. 1 is an example side view of an example embodiment of a high data throughput optical communication link, including a slab-shaped optical waveguide positioned between a high frequency optical receiver of a mobile radio device and a high frequency optical transmitter of a another device, the waveguide including a reflector array on a lower side of the waveguide, configured to reflect optical signals within the waveguide that were incident on a concentrating lens on the upper side of the waveguide, into total internally reflected optical signals that propagate in a generally longitudinal direction within the waveguide, the waveguide further including a reflecting conical surface located at a longitudinal distance within the waveguide from the reflector array, configured to reflect the total internally reflected optical signals through the lower side and out of the waveguide, to be incident on the high frequency optical receiver of the mobile radio device, in accordance with example embodiments of the invention.

FIG. 1 is an example side view of an example embodiment of a high data throughput optical communication link 10, in accordance with example embodiments of the invention. The example embodiment optical communication link 10 shown in the figure, is positioned between a high frequency optical receiver 16 of a mobile radio device 18 and a high frequency optical transmitter 112 of another device 114, such as a stationary or mobile electronic device. The optical communication link 10 includes a slab-shaped optical waveguide 20 positioned between the high frequency optical transmitter 112 of the other device 114 and the high frequency optical receiver 16 of the mobile radio device 18. The figure shows a band pass optical filter 15 coating the upper surface 30 of the waveguide 20, to pass optical signals 26 from the transmitter 112, into the waveguide 20 as filtered optical signals.

The waveguide 20 includes a reflector array 22 on a lower side 24 of the waveguide 20, configured to reflect the optical signals 26 within the waveguide 20 that were focused by a concentrating lens 28 on the upper side 30 of the waveguide 20, into total internally reflected optical signals 32 that propagate in a generally longitudinal direction within the waveguide 20. The waveguide 20 further includes a reflecting conical surface 34 of a reflecting cone 35 located at a longitudinal distance within the waveguide 20 from the reflector array 22. The reflecting conical surface 34 is configured to reflect the total internally reflected optical signals 32 through the lower side 24 and out of the waveguide 20, to be incident on the high frequency optical receiver 16 of the mobile radio device 18, in accordance with example embodiments of the invention.

The waveguide 20 may be composed of an optical glass or an optical quality thermoplastic, for example a polycarbonate, having an index of refraction n1. The waveguide 20 may be coated with a transparent cladding having a lower index of refraction n2 or it may be merely clad with ambient air, also having a lower index of refraction n2. Snell's Law says that at one particular angle, the critical angle, a light ray within the waveguide 20 will not be transmitted into the cladding of lower index n2, but instead will travel along the surface of the waveguide 20 between the two media. Snell's law may be expressed as the sine of the critical angle equaling the ratio of n2/n1, where n1 and n2 are the indices of refraction and n1 is greater than n2. If the light ray through the waveguide 20 is greater than the critical angle, then the refracted light ray will be reflected entirely back into the waveguide 20, that is, it will be totally internally reflected, even though the cladding or air may be transparent. In the waveguide 20, the light rays travel through the waveguide 20 by constantly reflecting from the lower index of refraction cladding, because the angle of the light is always greater than the critical angle.

In an example embodiment of the invention, the concentrating lens 28 formed on the upper side 30 of the waveguide 20, may be a two-dimensional array of refractive lenses focusing the light rays 26 onto the reflector array 22 on the lower side 24 of the waveguide 20. The reflector array 22 redirects the focused light rays 26 into the light rays 32 that propagate at angles that exceed the critical angle defined by Snell's Law for total internal reflection (TIR) within the waveguide 20. The light rays 32 propagate longitudinally within the waveguide 20 from the location of the reflector array 22 to the reflecting conical surface 34 of the reflecting cone 35.

In an example embodiment of the invention, the optical waveguide 20 may be composed of optical glass or optical quality thermoplastic, for example a polycarbonate, having an example thickness on the order of 1 mm. The reflector array 22 may be a plurality of TIR-based prisms or a plurality of mirror-coated facets formed on the surface 24 of the waveguide 20, to direct the focused light 26 into the waveguide 20. In an example embodiment, the mirror-coated facets may be molded in the lower side 24 of the waveguide 20 with a photosensitive polymer layer using photolithography techniques.

Figure 2:
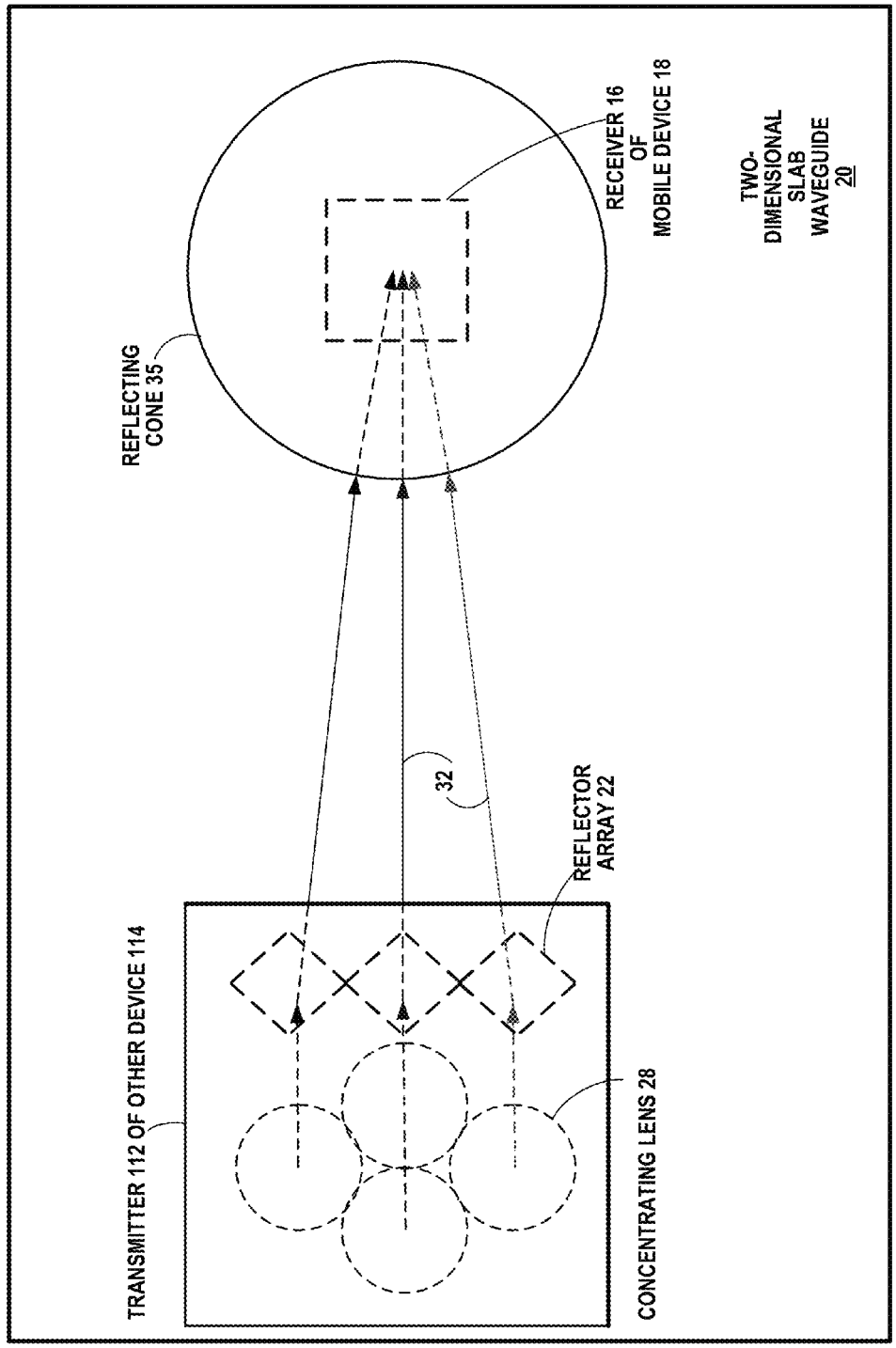
FIG. 2 is an example top view of the example embodiment of the slab-shaped optical waveguide of FIG. 1, showing the reflector array and concentrating lens in phantom lines beneath the high frequency optical transmitter of the other device, the figure further showing the receiver of the mobile radio device in phantom lines beneath the reflecting conical surface, the figure further showing the total internally reflected optical signals that propagate in a generally longitudinal direction within the waveguide from the reflector array to the conical surface and reflected by the reflecting conical surface through the lower side and out of the waveguide, to be incident on the high frequency optical receiver of the mobile radio device, in accordance with example embodiments of the invention.

FIG. 2 is an example top view of the example embodiment of the slab-shaped optical waveguide 20 of FIG. 1, showing the reflector array 22 and concentrating lens 28 in phantom dashed lines beneath the high frequency optical transmitter 112 of the other device 114. The figure further shows the receiver 16 of the mobile radio device 18 in phantom lines beneath the reflecting conical surface 34. The figure further showing the total internally reflected optical signals 32 that propagate in a generally longitudinal direction within the waveguide 20 from the reflector array 22 to the conical surface 34 and reflected by the reflecting conical surface 34 through the lower side 24 and out of the waveguide 20, to be incident on the high frequency optical receiver 16 of the mobile radio device 18, in accordance with example embodiments of the invention.

Figure 3:
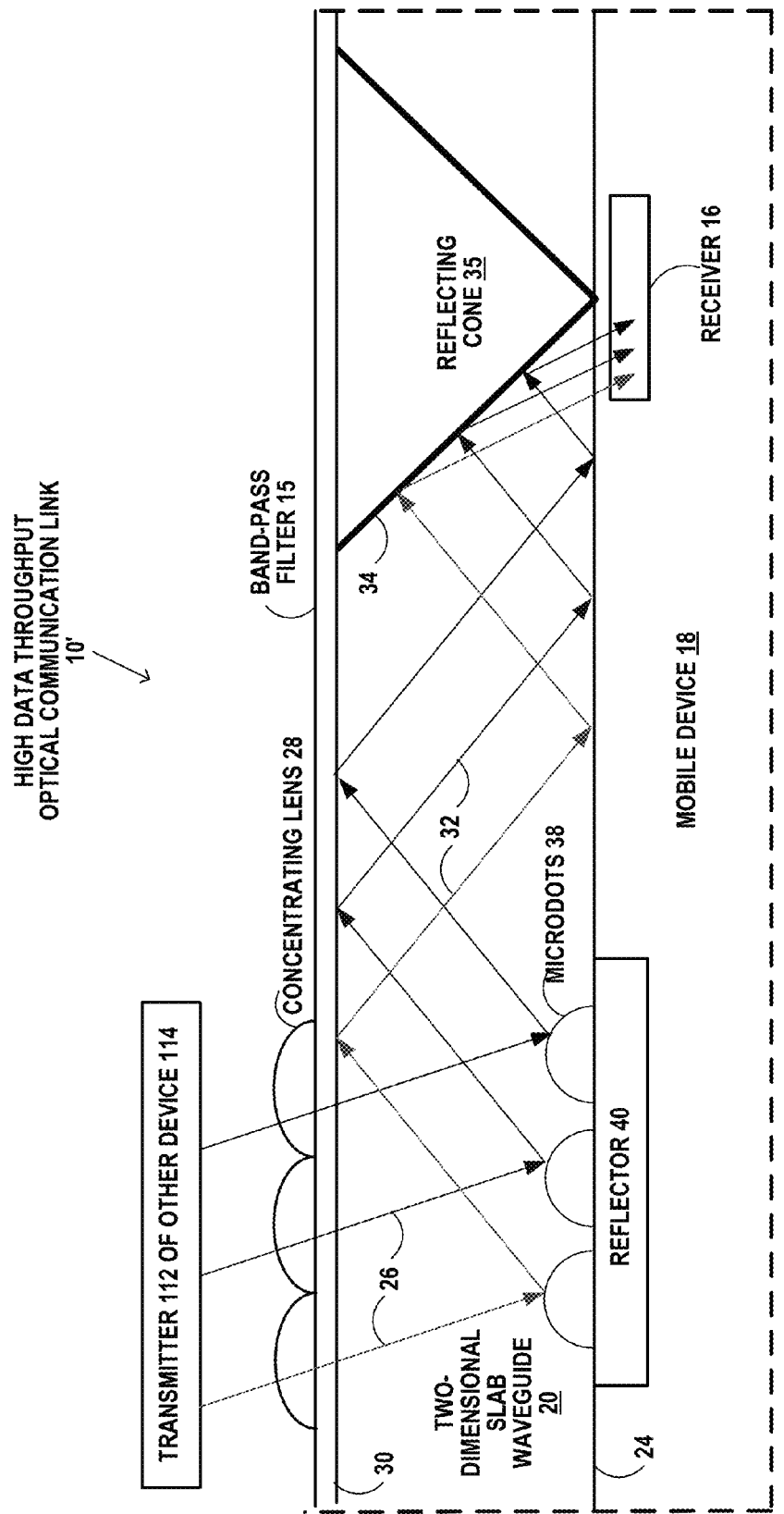
FIG. 3 is an example side view of example embodiment of the slab-shaped optical waveguide of FIG. 1, wherein an array of microdot reflectors is substituted for the reflector array in FIG. 1, in accordance with example embodiments of the invention.

FIG. 3 is an example side view of example embodiment 10' of the slab-shaped optical waveguide 10 of FIG. 1, wherein an array of microdot reflectors 38 and a reflector 40 are substituted for the reflector array 22 in FIG. 1, in accordance with example embodiments of the invention. Microdots 38 are small hemispheres concaved inwardly toward the inside of the slab-shaped optical waveguide 10. The slab-shaped optical waveguide 10 may be composed of an optical quality thermoplastic, for example a polycarbonate. The microdots 38 may be formed by a hot-press method, for example, wherein a pattern mold with protruding microdot hemispheres is heated to a sufficiently high temperature to mold the surface 24 of the thermoplastic waveguide 10 when the protruding microdot hemispheres are pressed into the surface 24. This produces an array of indented hemispheres 38 in the surface 24, as shown in FIG. 3. The indented microdots 38 may be formed with an example diameter between 40 µm and 80 µm. The microdot hemispheres 38 reflect light through total internal reflection of the light rays 26 within the waveguide 10 or they may have a reflective coating of aluminum deposited on the concave surface of the hemispheres 38.

Figure 4:
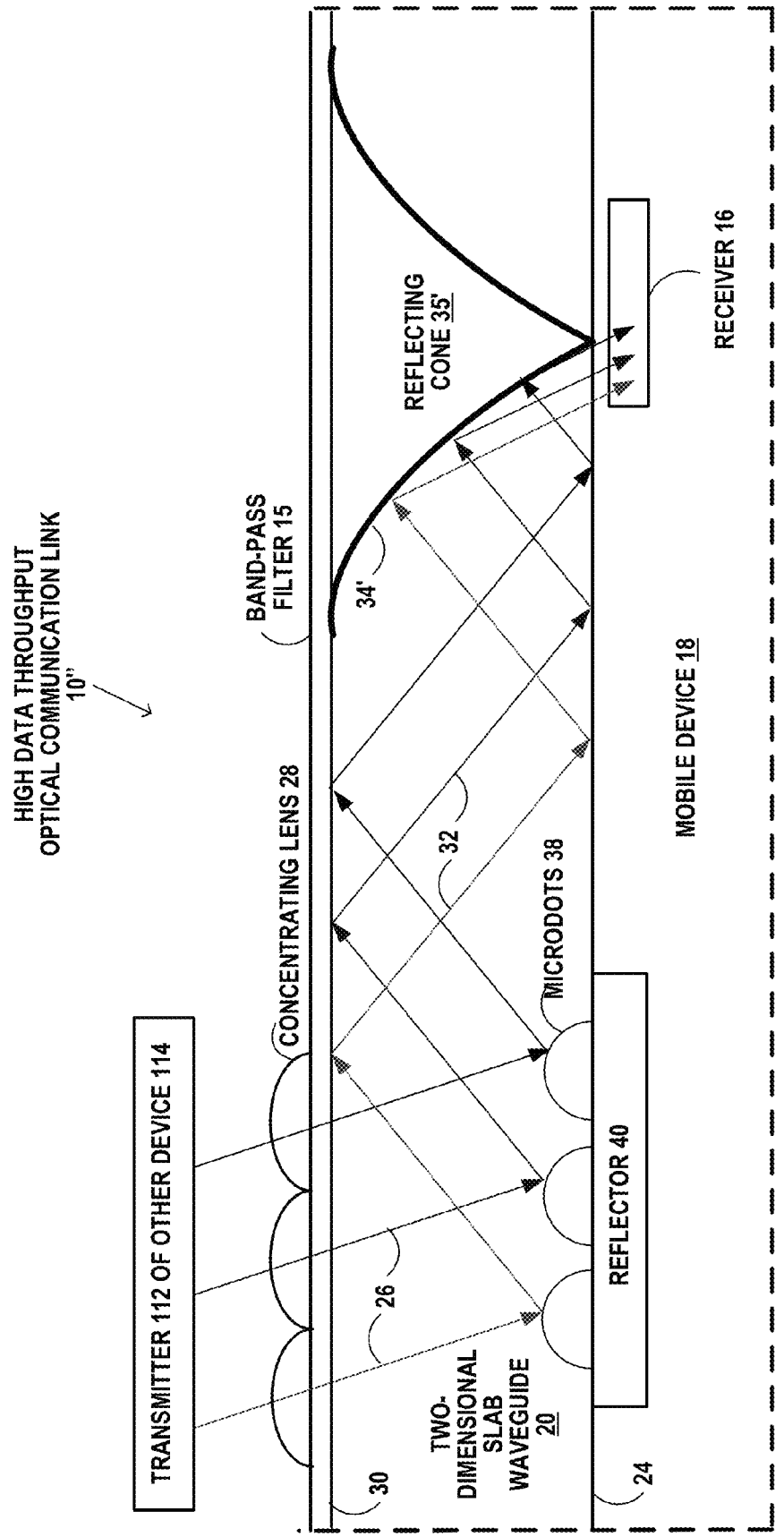
FIG. 4 is an example side view of example embodiment of the slab-shaped optical waveguide of FIG. 3, wherein a reflecting conical surface with a concave contour is substituted for the reflecting conical surface in FIG. 3, in accordance with example embodiments of the invention.

FIG. 4 is an example side view of example embodiment 10" of the slab-shaped optical waveguide embodiment 10' of FIG. 3, wherein a reflecting conical surface 34' with a concave contour is substituted for the reflecting conical surface 34 in FIG. 3, in accordance with example embodiments of the invention.

Figure 5:
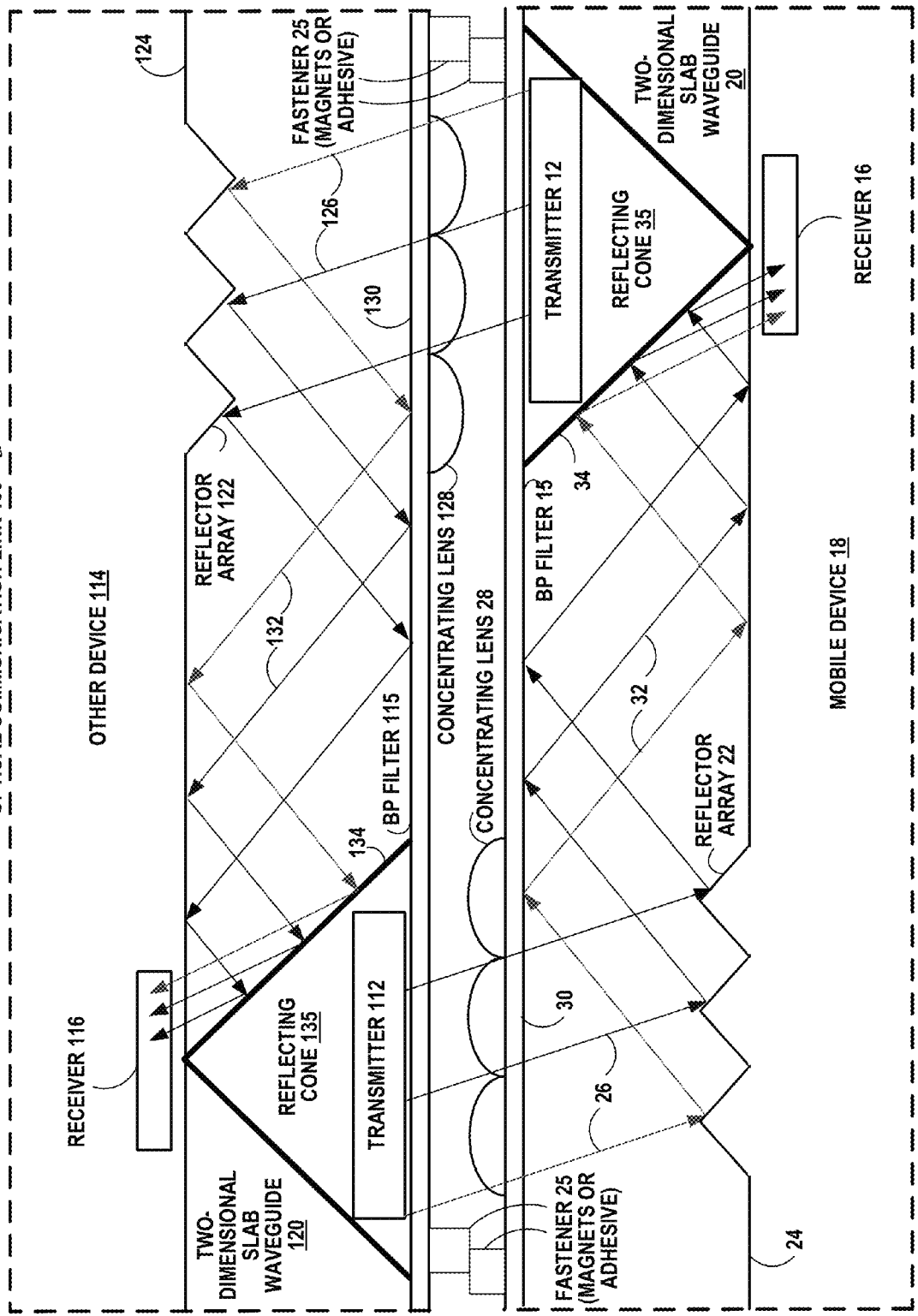
FIG. 5 is an example side view of an example embodiment of a bi-directional, high data throughput optical communication link, including a first slab-shaped optical waveguide having upper and lower planar surfaces mutually parallel to each other, positioned on a mobile radio device having a first high frequency optical receiver, the figure showing a second slab-shaped optical waveguide having upper and lower planar surfaces mutually parallel to each other, positioned on another device having a second high frequency optical receiver, the second waveguide being releasably positioned with its lower planar surface in a spaced, parallel relationship with the upper planar surface of the first waveguide, by means of one or more releasable fasteners, such as magnets or adhesive, in accordance with example embodiments of the invention.

FIG. 5 is an example side view of an example embodiment of a bi-directional, high data throughput optical communication link 100, including a first slab-shaped optical waveguide 20 having upper 30 and lower 24 planar surfaces mutually parallel to each other, positioned on a mobile radio device 18 having a first high frequency optical receiver 16. The figure shows a second slab-shaped optical waveguide 120 having upper 124 and lower 130 planar surfaces mutually parallel to each other, positioned on another device 114 having a second high frequency optical receiver 116. The second waveguide 120 is releasably positioned with its lower planar surface 130 in a spaced, parallel relationship with the upper planar surface 30 of the first waveguide 20, by means of one or more releasable fasteners 25, such as magnets or adhesive.

The figure shows a first cone 35 having an inner surface and hollow interior, and an outer surface 34, the first cone 35 located within the first slab-shaped optical waveguide 20, with its apex proximate to the first optical receiver 16. The hollow interior of the first cone 35 is open to the upper surface 30 of the first waveguide 20, the hollow interior of the first cone 35 containing a first high frequency optical transmitter 12 of the mobile radio device 18. The figure further shows a second cone 135 having an inner surface and hollow interior, and an outer surface 134, the second cone 135 located within the second slab-shaped optical waveguide 120, with its apex proximate to the second optical receiver 116. The hollow interior of the second cone 135 is open to the lower surface 130 of the second waveguide 120, the hollow interior of the second cone 135 containing a second high frequency optical transmitter 112 of the other device 114.

The figure further shows a second band pass optical filter coating 115 on the lower surface of the second slab-shaped optical waveguide 120, to pass first optical signals from the first transmitter 12, into the second slab-shaped optical waveguide 120 as filtered optical signals 126. The optical signals 126 are focused by a concentrating lens 128 on the lower side 130 of the second waveguide 120. The figure further shows a second reflector array 122 on the upper surface 124 of the second slab-shaped optical waveguide 120, configured to reflect the first optical signals 126 within the second slab-shaped optical waveguide 120, into first total internally reflected optical signals 132 that propagate in a generally longitudinal direction within the second slab-shaped optical waveguide 120. The figure further shows the outer surface 134 of the second cone 135 having a reflecting surface configured to reflect the first total internally reflected optical signals 132 through the upper surface 124 and out of the second slab-shaped optical waveguide 120, to be incident on the second high frequency optical receiver 116 of the other device 114.

The figure further shows a first band pass optical filter coating 15 on the upper surface 30 of the first slab-shaped optical waveguide 20, to pass second optical signals from the second transmitter 112, into the first slab-shaped optical waveguide 20 as filtered optical signals 26. The optical signals 26 are focused by a concentrating lens 28 on the upper side 30 of the first waveguide 20. The figure further shows a first reflector array 22 on the lower surface 24 of the first slab-shaped optical waveguide 20, configured to reflect the second optical signals 26 within the first slab-shaped optical waveguide 20, into second total internally reflected optical signals 32 that propagate in a generally longitudinal direction within the first slab-shaped optical waveguide 20. The figure further shows the outer surface 34 of the first cone 35 having a reflecting surface configured to reflect the second total internally reflected optical signals 32 through the lower surface 24 and out of the first slab-shaped optical waveguide 20, to be incident on the first high frequency optical receiver 16 of the mobile radio device 18.

The high frequency optical transmitters 12 and 112 may be semiconductor devices, such as light-emitting diodes (LEDs) and laser diodes. LED devices and semiconductor lasers may be modulated directly with electrical, high frequency data signals to produce and transmit optical signals modulated with the high frequency data.

The high frequency optical receivers 16 and 116 may be photodiodes. Incident light is absorbed in an exposed semiconductor surface of the photodiode to produce free electron-hole pair carriers that are collected in more heavily doped regions of the semiconductor body. In this manner, the received optical signals modulated with the high frequency data are converted into electrical, high frequency data signals.

Figure 6:
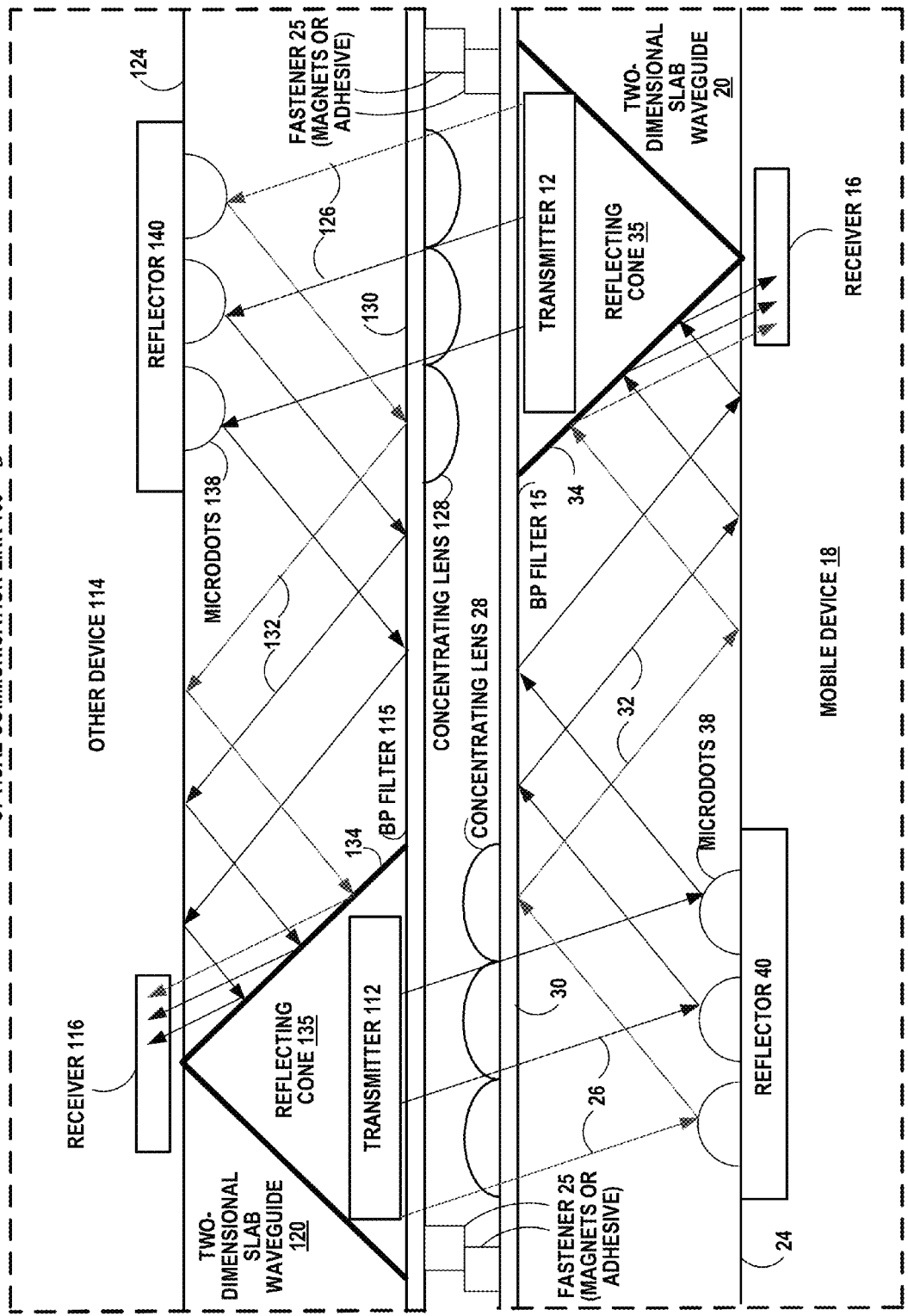
FIG. 6 is an example side view of the example embodiment of a bi-directional, high data throughput optical communication link of FIG. 5, wherein an array of microdot reflectors is substituted for the reflector array in FIG. 5, in accordance with example embodiments of the invention.

FIG. 6 is an example side view of the example embodiment 100' of a bi-directional, high data throughput optical communication link 100 of FIG. 5, wherein an array of microdot reflectors 38 and 138 and reflectors 40 and 140 are substituted for the respective reflector array 22 and 122 in FIG. 5, in accordance with example embodiments of the invention.

An example embodiment of the invention includes a system comprising:

a first slab-shaped optical waveguide 20 having upper 30 and lower 24 planar surfaces mutually parallel to each other, positioned on a mobile radio device 16 having a first high frequency optical receiver 16;

a second slab-shaped optical waveguide 120 having upper 124 and lower 130 planar surfaces mutually parallel to each other, positioned on another device 114 having a second high frequency optical receiver 116, the second waveguide being releasably positioned with its lower planar surface in a spaced, parallel relationship with the upper planar surface of the first waveguide, by means of one or more releasable fasteners 25;

a first cone 35 having an inner surface and hollow interior, and an outer surface 34, the first cone located within the first slab-shaped optical waveguide 20, with its apex proximate to the first optical receiver 16, the hollow interior of the first cone being open to the upper surface of the first waveguide, the hollow interior of the first cone containing a first high frequency optical transmitter 12 of the mobile radio device 18;

a second cone 135 having an inner surface and hollow interior, and an outer surface 134, the second cone located within the second slab-shaped optical waveguide 120, with its apex proximate to the second optical receiver 116, the hollow interior of the second cone being open to the lower surface of the second waveguide, the hollow interior of the second cone containing a second high frequency optical transmitter 112 of the other device 114;

a second band pass optical filter coating 115 on the lower surface 130 of the second slab-shaped optical waveguide 120, to pass first optical signals 126 from the first transmitter 12, into the second slab-shaped optical waveguide 120, as filtered optical signals;

a second reflecting surface 122 or 138 on the upper surface 124 of the second slab-shaped optical waveguide 120, configured to reflect the first optical signals 126 within the second slab-shaped optical waveguide 120, into first total internally reflected optical signals 132 that propagate in a generally longitudinal direction within the second slab-shaped optical waveguide 120;

the outer surface 134 of the second cone 135 having a reflecting surface configured to reflect the first total internally reflected optical signals 132 through the upper surface 124 and out of the second slab-shaped optical waveguide 120, to be incident on the second high frequency optical receiver 116 of the other device 114;

a first band pass optical filter coating 15 on the upper surface 30 of the first slab-shaped optical waveguide 20, to pass second optical signals 26 from the second transmitter 112, into the first slab-shaped optical waveguide 20 as filtered optical signals;

a first reflecting surface 22 or 38 on the lower surface 24 of the first slab-shaped optical waveguide 20, configured to reflect the second optical signals 26 within the first slab-shaped optical waveguide 20, into second total internally reflected optical signals 32 that propagate in a generally longitudinal direction within the first slab-shaped optical waveguide 20; and the outer surface 34 of the first cone 35 having a reflecting surface configured to reflect the second total internally reflected optical signals 32 through the lower surface 24 and out of the first slab-shaped optical waveguide 20, to be incident on the first high frequency optical receiver 16 of the mobile radio device 18.

In accordance with an example embodiment of the invention, the other device, such as an accessory device, may be attached to a mobile radio device using magnets or self-adhesive surfaces to prevent large movements between the other device and the mobile device and to provide a short ~1-5 mm free-space between the devices. The resulting infrared 1-20 Gbps bidirectional link may be used for data transfer.

In accordance with an example embodiment of the invention, positioning between the devices is accurate and ambient light, such as sunlight or indoor illumination, does not significantly couple into receiving photo-sensor, because the other device and the mobile device are brought near to each other prevent entry of unwanted light.

In accordance with an example embodiment of the invention, a narrow aperture is provided for transmitting a relatively large optical signal within the limits of eye safety regulations.

In accordance with an example embodiment of the invention, the optical cone incident on the receiver is narrow to prevent ambient light from reaching the receiving sensor, by including angle dependency characteristics in the anti-reflecting bandpass coating. The other mobile device will then prevent most of the ambient light from reaching the receiving sensor.

In accordance with an example embodiment of the invention, a very large area concentrating lens may be part of the mobile device cover, to focus the beam into a small area of one or a few square micrometers at the receiver. At data rates of 1 Gbps, a receiver area of up to about 1 $mm^2$ for the photo-detector diode may be used. However, for data rates at 20 Gbps, the capacitance of the photo-detector may be to be significantly reduced by further reducing the receiver area of the photo-detector diode.

In accordance with an example embodiment of the invention, the frequency used for signaling may typically be 1550 nm within a +−50 nm band around 1550 nm and other frequencies are filtered. Other frequencies used for signaling may be 825 nm and 1300 nm. A bandpass filter may be included in the cover structure of either device. A prism filter may be used in the concentrating lens near the receiver, to avoid noise generated by ambient light. The lens may be covered by anti-reflecting coating for the intended wavelength. In this way, the intended signal wavelength may pass through the filtering and anti-reflecting cover without significant losses and all other wavelengths may be highly suppressed.

In accordance with an example embodiment of the invention, an NFC out-of-band connection set-up may be used for infrared data communication (IRDA) through the optical link.

In accordance with an example embodiment of the invention, signaling wavelengths are chosen where the portion of the terrestrial sun spectrum intensity is small, such as 1550 nm.

In accordance with an example embodiment of the invention, the signal wavelength may be converted from 1550 nm or other signal wavelength, into a lower frequency using metal nanoparticles dispersed into a filter, that change the frequency into a lower value. This will enable the use of standard 1550 nm, 1300 nm and 850 nm fiber optics components, but ambient sunlight generated noise will be significantly reduced, because the standard wavelengths do not fit into the lowest solar spectral minima.

In accordance with an example embodiment of the invention, receiver pulse response time may be matched into the incoming signal waveform by using the recovered clock from the received signal. This will reduce thermal noise originating from a transconductance amplifier feedback resistor. The feedback resistor of a transconductance amplifier may be replaced by a switch that is used to maintain the dc-balance of the signal and to reset the accumulated charge from the leakage and signal current at the input of the transconductance amplifier.

In accordance with an example embodiment of the invention, the link may conduct simultaneous bidirectional signaling. The transmitter is positioned so that its signal will not disturb reception at the receiver. An anti-reflecting filter may be positioned on the outer surface above the concentrating lens to prevent signal reflection backwards and to guarantee a large signal amplitude at the target receiver. Since the distance between the transmitter and receiver is very small, attenuation is so low that the any potential back reflection of the signal does not significantly disturb signal detection.

In accordance with an example embodiment of the invention, the transmitting mobile device prevents detection of ambient light when a filter is located on top of the concentrating lens to pass only the signal wavelength at a narrow cone of approximately ten degrees. Depending on how accurately the magnets or alternatively mechanical guides, are able to position the other device on the mobile device, the concentrating lens and the infrared window may be relatively small. For example the concentrating lens may be 5 mm×5 mm, if a +−2.5 mm position accuracy is achieved.

In accordance with an example embodiment of the invention, the receiving sensor may be very small, in the micrometer scale, to keep the capacitance so low that up to 20 Gbps bit rates are possible.

In accordance with an example embodiment of the invention, the transmitted beam may be narrow to enable propagation only along essentially a single path without multi-path propagation. The signal should remain narrow in time, on the order of a few picoseconds, to avoid use of complicated multichannel equalization. The 20 Gbps bit rates represents 50 ps bit period and the target is to keep the propagation delay difference of the beam components within 5 ps. Because the receiver lens dimensions are on the order of several centimeters, the 5 ps timing jitter target represents 500 micrometer propagation distance difference. The target is to use as small a concentrating lens as possible, preferentially less than 1 cm in diameter. Even in the case of a 3 cm diameter receiver lens, the target propagation length difference is less than 2% of the diameter of the lens.

In accordance with an example embodiment of the invention, there are at least two candidate bands of special interest. One at about 800 nm, where Si-based photodiodes may be used, but then the maximum allowed transmission power may be limited. The other band is between about 1300 nm and 1550 nm, where fiber optic components are also readily available.

In accordance with an example embodiment of the invention, the optical link may be used for communication between two mobile devices. the optical link prevents ambient light from coupling into the receiver, even when the concentrating lens is large, for example 3 cm×3 cm, to make it comfortable for user to get the mobile device into a proper position for data transmission between them. The mobile devices will prevent significant ambient light coupling, when the concentrating lens is covered by an angle of incidence dependent filter, in addition to the wavelength dependent filter.

In accordance with an example embodiment of the invention, if no filters are used, then up to 18 mW optical power should be transmitted for 3×3 cm large concentrating lens, and up to 50 mW for 50 mm×50 mm concentrating lens, to get a large enough signal to noise ratio in bright sunlight. By using the filters, only a few mW of signal should be enough, making the optical link power consumption significantly smaller than with 60 GHz RF links.

Figure 7A:
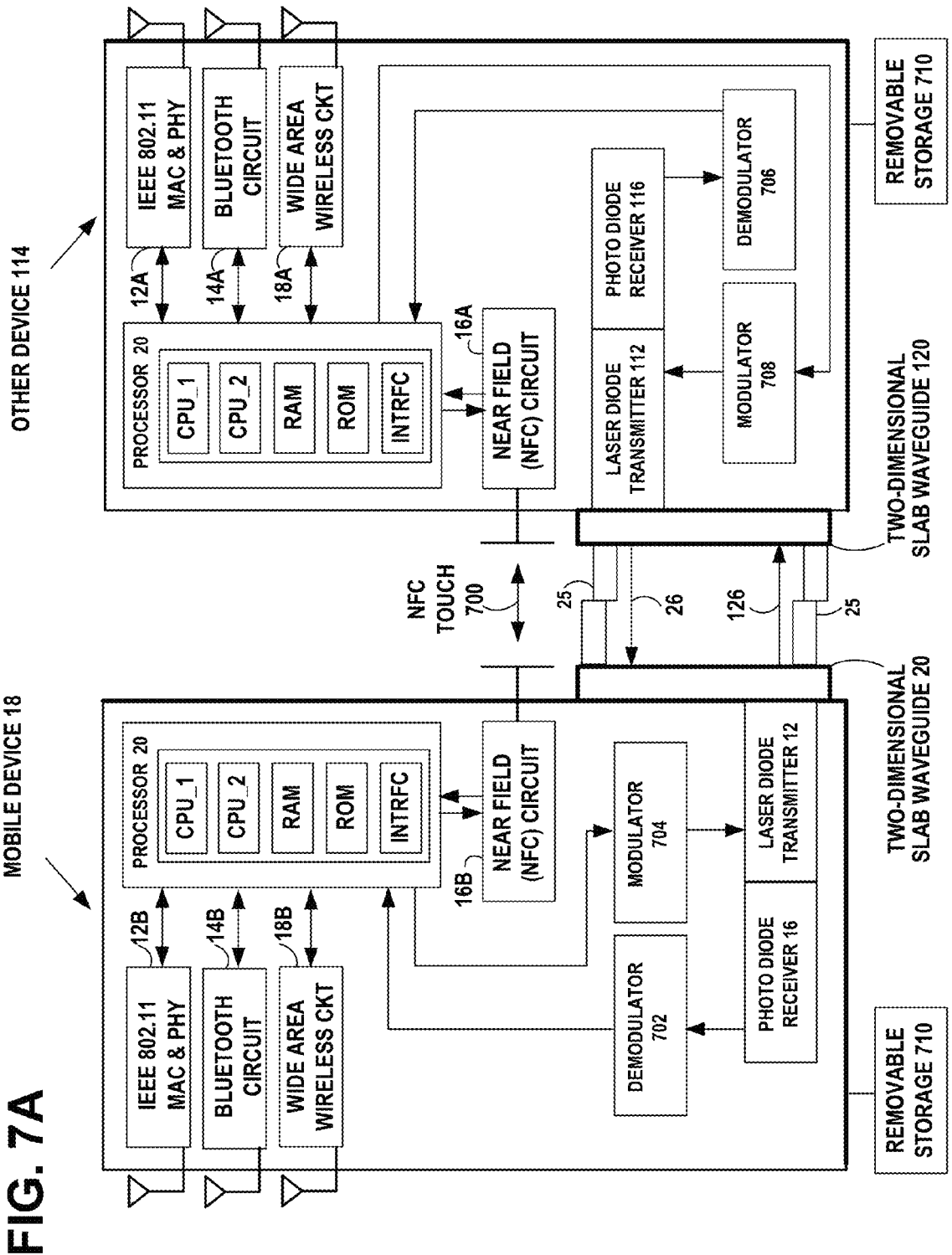
FIG. 7A is an example functional block diagram of the mobile radio device having the first slab-shaped optical waveguide mounted thereon and the other device, being another mobile radio device, having the second slab-shaped optical waveguide mounted thereon, each device further including an NFC circuit that generates a triggering signal when the respective NFC circuits are brought within an NFC touch proximity, the triggering signal causing the diode laser transmitter in one or both devices to begin transmitting optical signals modulated with data to be transferred through the high data throughput optical link, in accordance with example embodiments of the invention.

FIG. 7A is an example functional block diagram of the mobile radio device 18 having the first slab-shaped optical waveguide 20 mounted thereon and the other device 114, for example another mobile radio device, having the second slab-shaped optical waveguide 120 mounted thereon. Each device 18 and 114 further includes a respective NFC circuit 16B and 16A that generates a triggering signal when the respective NFC circuits are brought within an NFC touch proximity 700.

Communication between two NFC-compatible devices occurs when they are brought within close proximity of each other: A simple wave or touch can establish an NFC connection. The triggering signal from the NFC circuits causes the diode laser transmitter 12 and/or 112 in one or both devices 18 and/or 114 to begin transmitting modulated optical signals 26 and/or 126 modulated with data to be transferred through the high data throughput optical link formed by the two wave guides 20 and 120, in accordance with example embodiments of the invention. FIG. 7A also shows the releasable fasteners 25 to maintain alignment between the optical waveguides 20 and 120.

Modulator 704 in device 18 may modulate the laser diode transmitter 12 directly with electrical, high frequency data signals to produce optical signals 126 modulated with the high frequency data, transmitted from device 18 to the wave guide 120 and photodiode receiver 116 in device 114. In device 114, the demodulator 706 demodulates the received modulated optical signal 126 and the transferred data is provided to the processor 20 in device 114, in accordance with example embodiments of the invention.

Modulator 708 in device 114 may modulate the laser diode transmitter 112 directly with electrical, high frequency data signals to produce optical signals 26 modulated with the high frequency data, transmitted from device 114 to the wave guide 20 and photodiode receiver 16 in device 18. In device 18, the demodulator 702 demodulates the received modulated optical signal 26 and the transferred data is provided to the processor 20 in device 18, in accordance with example embodiments of the invention.

Near-field communication (NFC) technology communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The user may bring the two NFC devices close to one another to allow near field communication between the devices. Communication between two NFC devices occurs when they are brought within close proximity of each other: A simple wave or touch can establish an NFC connection that may be used to exchange specific information for another communications protocol, which may then be used to create an actual connection in the other communications protocol.

NFC technology is an extension of the ISO/IEC 14443 proximity-card standard for contactless smartcards and radio frequency ID (RFID) devices, which combines the interface of a contactless smartcard and a reader into a single device, and uses the ISO/IEC 18092 NFC communication standard to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

Each device 18 and 114 may further include an a Bluetooth transceiver 14B and 14A, a short-range carrier transceiver, such as an IEEE 802.11 WLAN 12B and 12A, and a wide-area wireless circuit 18B and 18A, respectively, in accordance with example embodiments of the invention. The IEEE 802.11 standard consolidated IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012. Bluetooth™ standard is described in the Bluetooth™ Specification, Version 4, Jun. 30, 2010.

Figure 11:
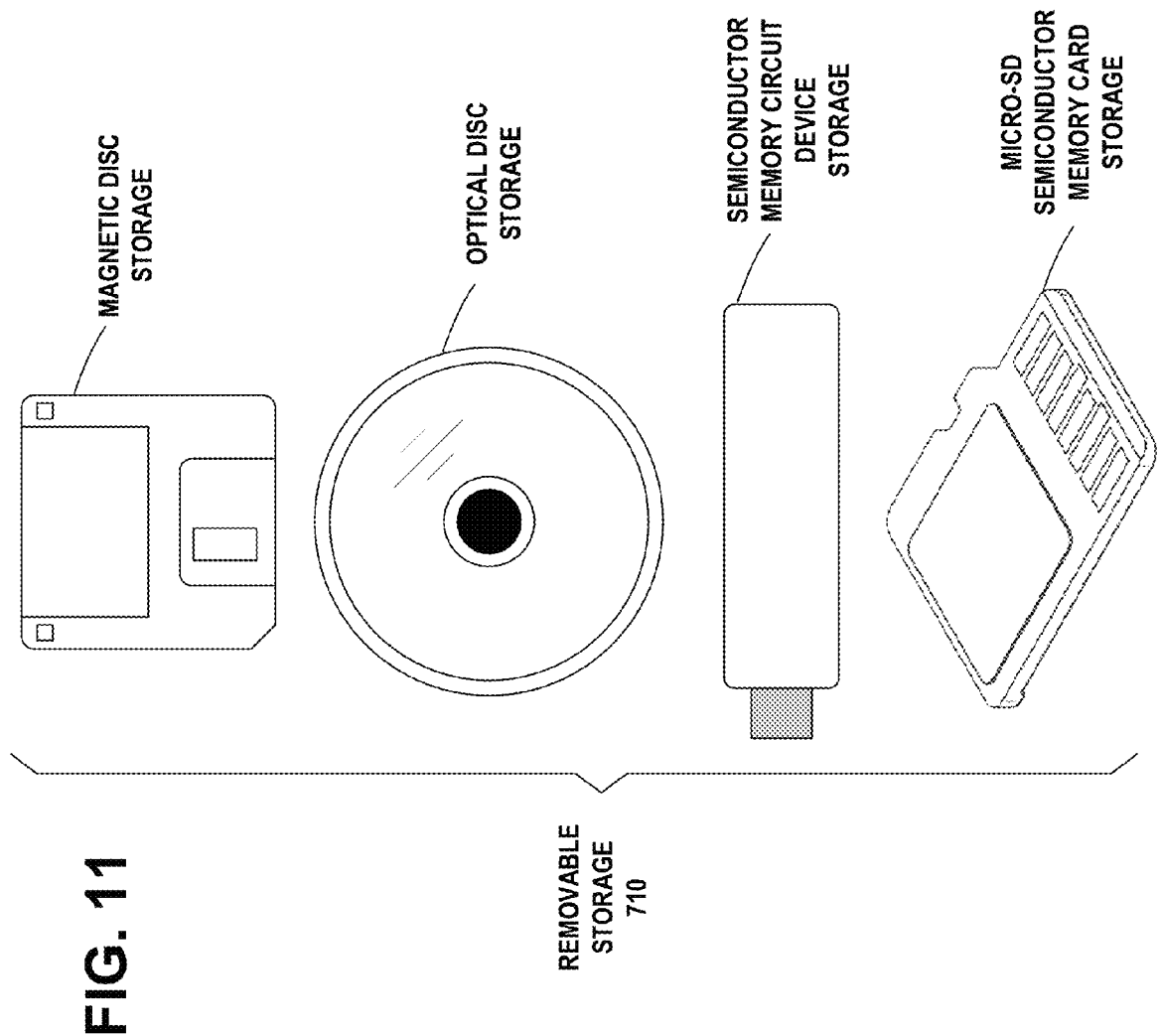
FIG. 11 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, each device 18 and 114 may each be a device having an overall function as a PDA, cell phone, laptop or palmtop computer, or the like. The devices 18 and 114 each include a processor 20 that includes a dual core or multi-core central processing unit (CPU_1 and CPU_2), a random access memory (RAM), a read only memory (ROM), and interface circuits to interface with circuits, such as a cell phone radio, a battery and other power sources, key pad, touch screen, display, microphone, speakers, ear pieces, camera or other imaging devices, etc. in the devices 18 and 114. The RAM and ROM may be removable memory devices 126 such as smart cards, SIMs, WIMs, semiconductor memories such as RAM, ROM, PROMS, flash memory devices, etc., as shown in FIG. 11. The IEEE 802.11 MAC and PHY 12A and 12B, provide the medium access control and radio for IEEE 802.11 WLAN communications. The devices 18 and 114 may include a user interface such as a key pad. The devices 18 and 114 have similar components.
I In an example embodiment of the invention, each NFC circuit 16A in device 114 and NFC circuit 16B in device 18, communicates bi-directionally with the other NFC circuit 16A or 16B via magnetic field induction, where two loop antennas are located within each other's near field, effectively energizing a wireless contact by forming an air-core transformer. An example NFC radio of NFC circuit 16A or 16B operates within the unlicensed radio frequency ISM band of 13.56 MHz, with a bandwidth of approximately 2 MHz over a typical distance of a few centimeters. The NFC circuit 16A or 16B may be affixed to or an integral part of devices 18 and 114 and the user brings the NFC radio on the device close to the other NFC circuit 16A or 16B of the other device to allow near field, bidirectional communication between the devices.

Figure 7B:
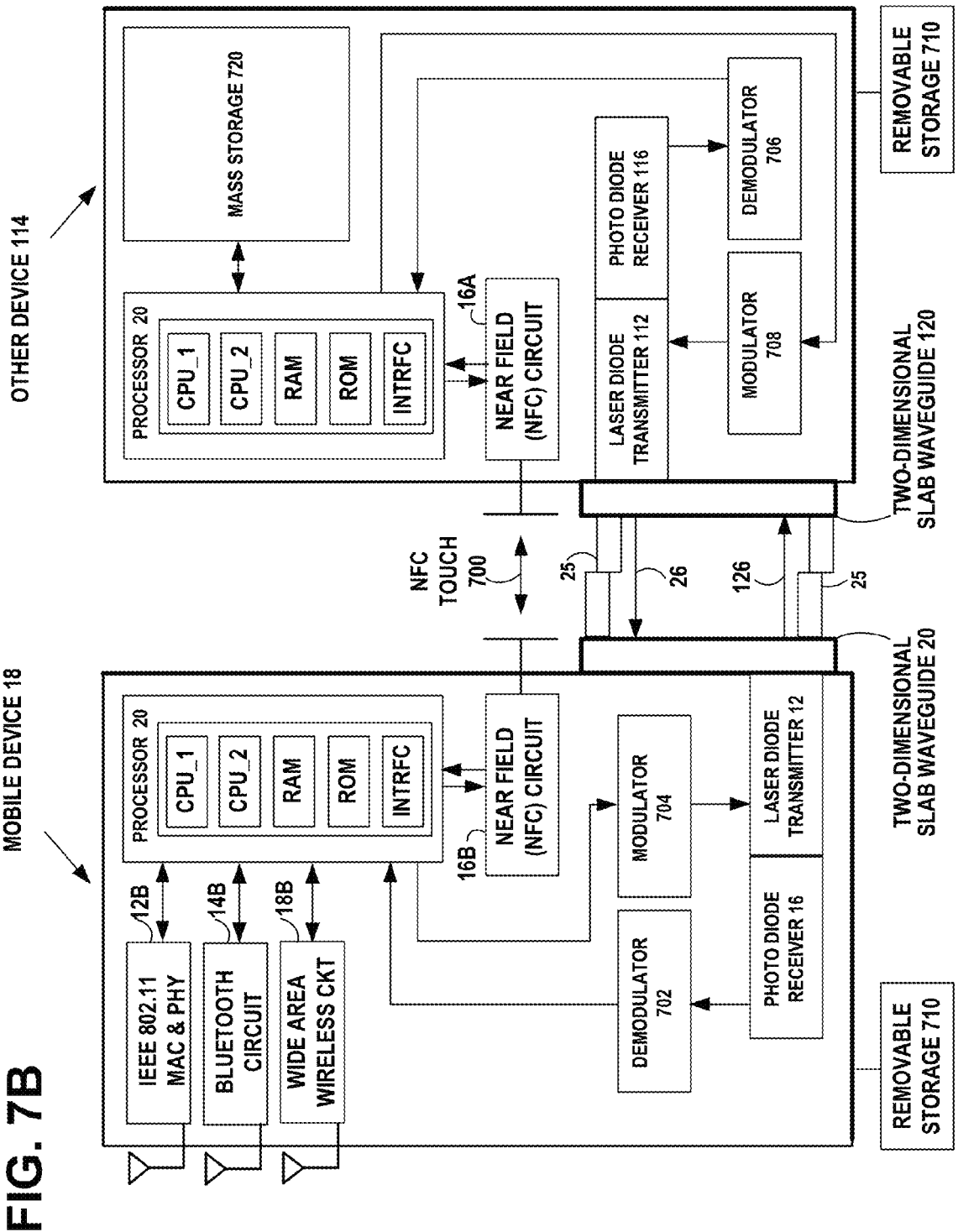
FIG. 7B is an example functional block diagram of the mobile radio device having the first slab-shaped optical waveguide mounted thereon and the other device, being a mass storage device, having the second slab-shaped optical waveguide mounted thereon, each device further including an NFC circuit that generates a triggering signal when the respective NFC circuits are brought within an NFC touch proximity, the triggering signal causing the diode laser transmitter in one or both devices to begin transmitting optical signals modulated with data to be transferred through the high data throughput optical link, in accordance with example embodiments of the invention.

FIG. 7B is an example functional block diagram of the mobile radio device 18 having the first slab-shaped optical waveguide 20 mounted thereon and the other device 114, being a mass storage device 720, having the second slab-shaped optical waveguide 120 mounted thereon, each device further including an NFC circuit 16A and 16B that generates a triggering signal when the respective NFC circuits are brought within an NFC touch proximity 700, the triggering signal causing the diode laser transmitter 12 and/or 112 in one or both devices, to begin transmitting optical signals 26 and/or 126 modulated with data to be transferred through the high data throughput optical link formed by the two wave guides 20 and 120, in accordance with example embodiments of the invention.

Figure 7C:
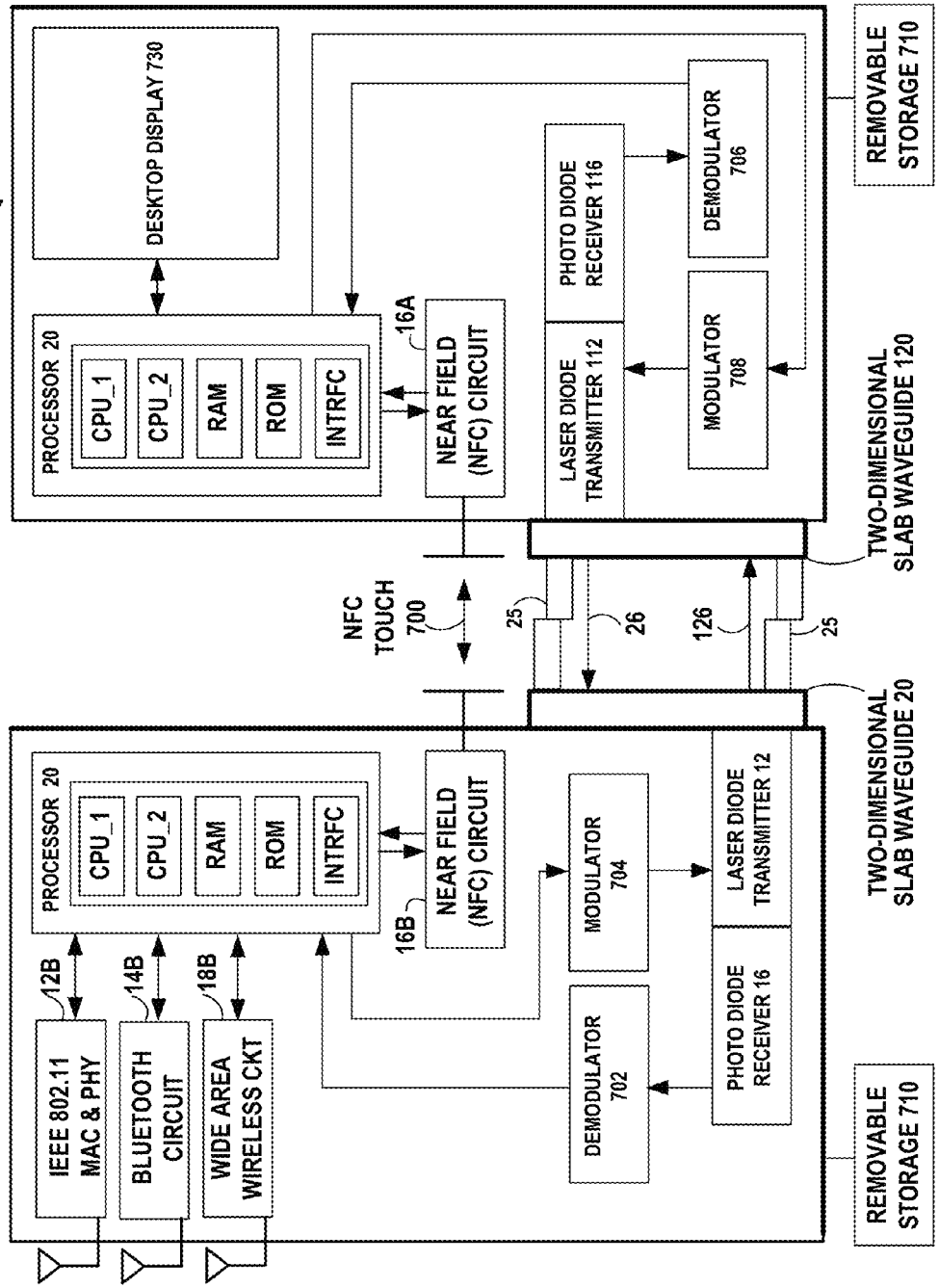
FIG. 7C is an example functional block diagram of the mobile radio device having the first slab-shaped optical waveguide mounted thereon and the other device, being a stationary desktop display device, having the second slab-shaped optical waveguide mounted thereon, each device further including an NFC circuit that generates a triggering signal when the respective NFC circuits are brought within an NFC touch proximity, the triggering signal causing the diode laser transmitter in one or both devices to begin transmitting optical signals modulated with data to be transferred through the high data throughput optical link, in accordance with example embodiments of the invention.

FIG. 7C is an example functional block diagram of the mobile radio device 18 having the first slab-shaped optical waveguide 20 mounted thereon and the other device 114, being a stationary desktop display device 730, having the second slab-shaped optical waveguide 120 mounted thereon, each device further including an NFC circuit 16A and 16B that generates a triggering signal when the respective NFC circuits are brought within an NFC touch proximity 700, the triggering signal causing the diode laser transmitter 12 and/or 112 in one or both devices to begin transmitting optical signals modulated with data to be transferred through the high data throughput optical link formed by the two wave guides 20 and 120, in accordance with example embodiments of the invention.

Figure 8A:
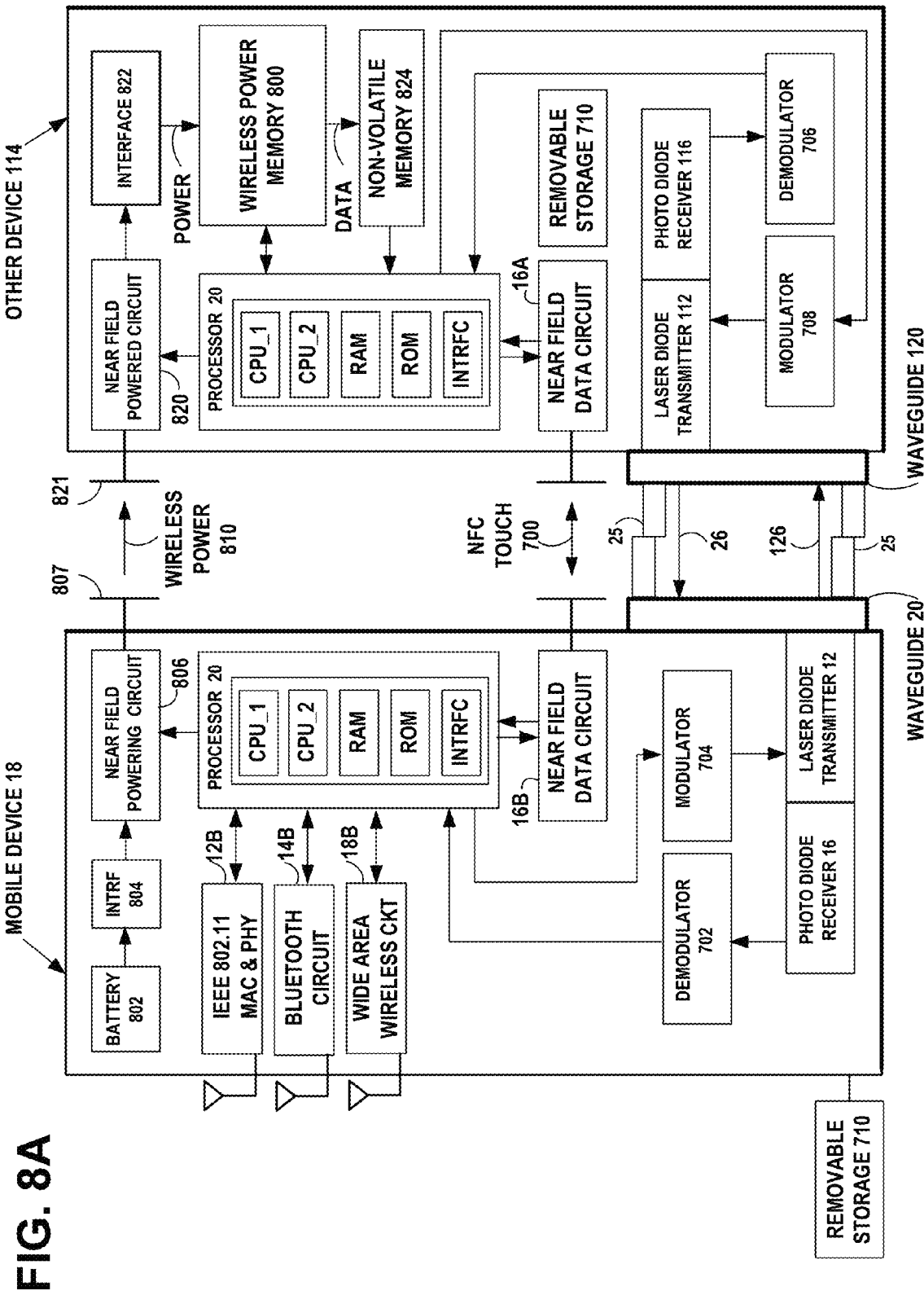
FIG. 8A is an example functional block diagram of the mobile radio device having the first slab-shaped optical waveguide mounted thereon and an NFC wireless powering circuit and the other device, being a wireless memory device, having the second slab-shaped optical waveguide mounted thereon and an NFC wireless powered circuit, each device further including an NFC circuit that generates a triggering signal when the respective NFC circuits are brought within an NFC touch proximity, the triggering signal causing the diode laser transmitter in one or both devices to begin transmitting optical signals modulated with data to be transferred through the high data throughput optical link, in accordance with example embodiments of the invention.

FIG. 8A is an example functional block diagram of the mobile radio device 18 having the first slab-shaped optical waveguide 20 mounted thereon and an NFC wireless powering circuit 806 and the other device 114, including a wireless power memory 800, having the second slab-shaped optical waveguide 120 mounted thereon and an NFC wireless powered circuit 820. Each device 18 and 114 further includes a respective NFC data 16B and 16A circuit that generates a triggering signal when the respective NFC circuits 16B and 16A are brought within an NFC touch proximity 700, the triggering signal causing the diode laser transmitter 12 and/or 112 in one or both devices to begin transmitting optical signals modulated with data to be transferred through the high data throughput optical link formed by the two wave guides 20 and 120, in accordance with example embodiments of the invention.

In an example embodiment of the invention, the mobile device 18 includes the battery 802, interface circuit 804, and near field powering circuit 806 and NFC antenna 807. The other device 114 includes the near field powered circuit 820 and NFC antenna 821, and the interface circuit 822. The wirelessly powered memory 800 may require operating power from the interface 822 in order to read and write data. Wireless power 810 is transferred from the powering circuit 806 and NFC antenna 807 in the mobile device 18 to the powered circuit 820 and NFC antenna 821 in the other device 114 when the respective processors 20 in the mobile device 18 and other device 114 indicate that a near field touch 700 has been detected by the respective near field data circuit 16B and near field data circuit 16A. Data read from the wirelessly powered memory 800 may be buffered in the non-volatile memory 824, for downloading to the mobile device 18 via the high data throughput optical communication link provided by the optical waveguide 20 and optical waveguide 120. The non-volatile memory 824 may require operating power from the interface 822 in order to read and output data.

In an example embodiment of the invention, the power management of wireless powering is arranged as part of Near Field Communication (NFC) operation. A special wireless powering mode is used to keep high power transfer efficiency on during the whole data transfer session of the wireless memory operation. Power transfer of 20-50 mW power class can be done using standard NFC transceivers 806 and 820 and typical NFC antennas up to 30 mm distances. The higher power classes of 50-100 mW and 100-150 mW requires special circuits and are arranged as follows:

1. NFC antenna 807 and 821 are extended with additional switchable antenna elements and/or other components that the same antenna system can operate in at least two modes/states (low-Q for communication purposes and high-Q for power transfer purposes).

2. The standard NFC transmit (Tx)/receive (Rx) circuitry 16A and 16B is disconnected in mobile device 18 and other device 114 after negotiations with standard NFC communication, and the system is set to the high-Q state to increase Q>100 at mobile device 18 and other device 114, and up to 150 mW power is available in the other device 114 (during the charging period or wireless memory communication period).

At the end of the wireless memory session, the antenna system returns to low-Q state returning Q of the antennas 807 and 821 to ~30 and NFC communication could be used to end the session.

3. NFC antennas 807 and 821 extended with additional components to improve power transmission efficiency so that >75% of the 200 mW available in standard NFC transmitter antenna is transferred into the other device 114 (during the charging period or wireless memory communication period).

In an example embodiment of the invention, there are four different cases that a device with both NFC capability and wireless charging capability may build for the NFC system in FIG. 8A: [1] the mobile device 18 may be read or read the other device 114, and it may be charged or it may charge another device. When the wireless charging begins, both of the devices 18 and 114 are in the NFC data transfer state. In this state the devices may discover one another and set up a connection according to predefined rules. In the NFC data transfer state, information may be exchanged as to whether either one of the devices needs charging or is capable of charging another device. If either one of the devices has a flag up for need of charging and the other one agrees to provide power, then the devices may change in a controlled manner to the wireless charging state or wireless powering state. In this wireless charging state the Q-factor of the antennas 807 and 821 is increased for more efficient power transfer.

In an example embodiment of the invention, the wireless charging or wireless powering state lasts for a predefined time, after which both of the devices return to the NFC data transfer state in order to communicate with one another. During the data transfer state, the devices may go through the same predefined sequence where both of the devices check their own situation and determine if charging is needed or if they can charge another device. If the earlier situation reoccurs wherein further charging or powering is required, then both devices return to the wireless charging state again. This transition back and forth between the two states continues until wireless charging is no longer needed or cannot be provided. Thus, wireless charging happens in bursts.

In an example embodiment of the invention, the other device 114 may be a video camera, that uses a battery and in operation, records video and stores it into a non-volatile memory 824. Later, wireless power may be provided by the mobile device 18 to the video camera 114, when it is desired to download the content from the non-volatile memory 824 into the mobile device 18.

In an example embodiment of the invention, the mobile device 18 and the other device 114 handle the negotiation settings, to start discussing what the frequency should be, to find out what elements are available, and when to start powering, prevent powering, and how to obey powering modes. Example steps in the negotiation between mobile device 18 and the other device 114 may include the following:

Make NFC query for the recipient;
Wait for response;
NFC powering rules checked;
Set powering control according to powering modes defined/available;
When operational environment changed, start powering (e.g. NFC) query again;
Continue powering at selected powering level, until communication is ready and then return to NFC communication, or generate a "disconnected" error message;
If "disconnected" error message was generated, return to NFC communication, and inform the user to place the mobile device 18 more closely the other device 114 to be read/written and ask user to try again; and If wirelessly charging the other device 114, place the other device 114 to be charged on a table and place the mobile device 18 on the table and on top of the other device 114, and push "power load". The mobile device 18 will continue charging until the other device 114 battery is full, or until the mobile device 18 battery content is reduced, for example, to 50%. Mobile device will inform user when the charging is ended.

Figure 8B:
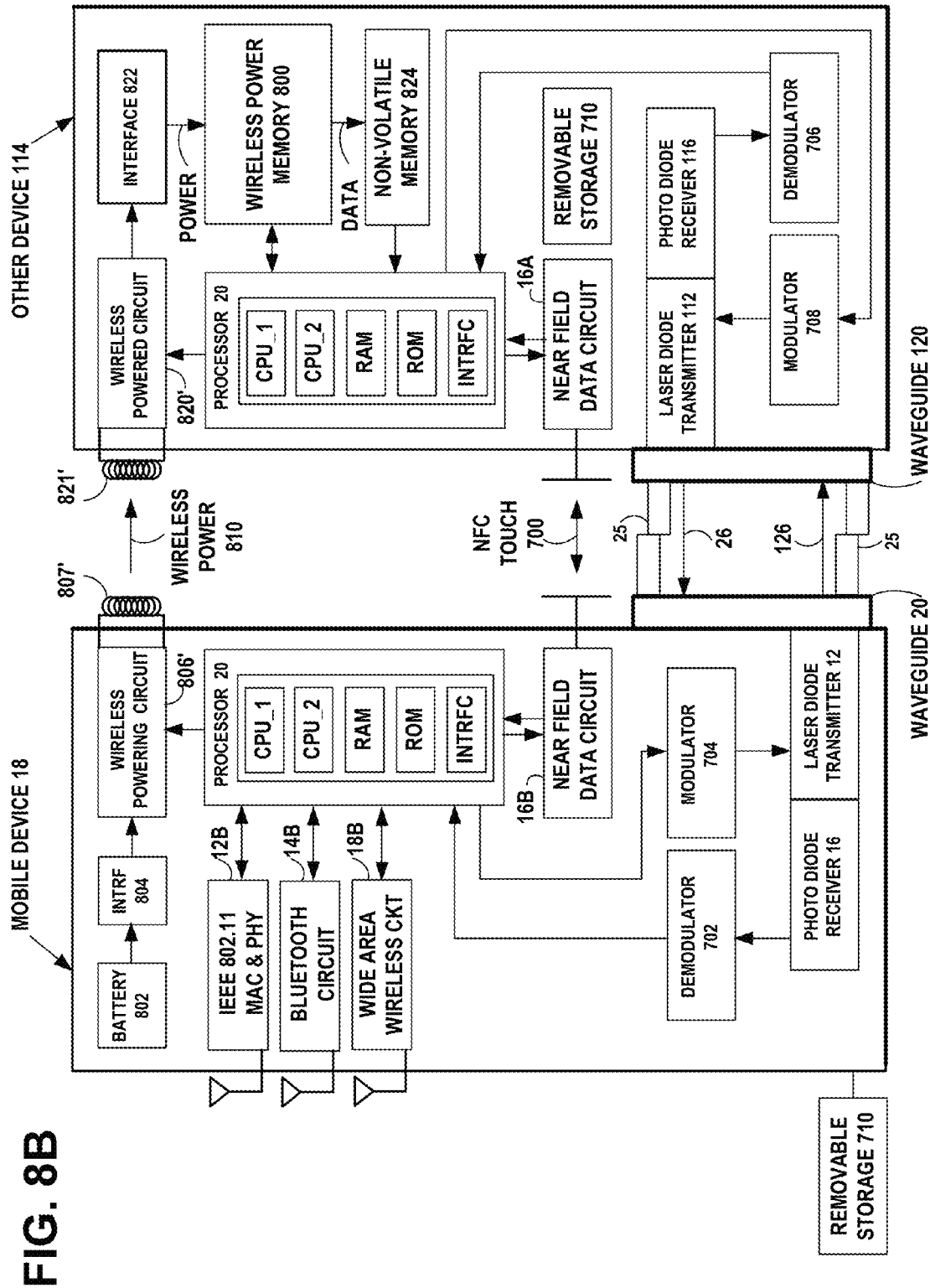
FIG. 8B is an example functional block diagram of the mobile radio device having the first slab-shaped optical waveguide mounted thereon and a wireless powering circuit and the other device, being a wireless memory device, having the second slab-shaped optical waveguide mounted thereon and a wireless powered circuit, each device further including an NFC circuit that generates a triggering signal when the respective NFC circuits are brought within an NFC touch proximity, the triggering signal causing the diode laser transmitter in one or both devices to begin transmitting optical signals modulated with data to be transferred through the high data throughput optical link, in accordance with example embodiments of the invention.

FIG. 8B is an example functional block diagram of the mobile radio device 18 having the first slab-shaped optical waveguide 20 mounted thereon and a wireless powering circuit 806' and the other device 114, including a wireless powered memory 800, having the second slab-shaped optical waveguide 120 mounted thereon and a wireless powered circuit 820'. Each device 18 and 114 further includes a respective NFC data 16B and 16A circuit that generates a triggering signal when the respective NFC circuits 16B and 16A are brought within an NFC touch proximity 700, the triggering signal causing the diode laser transmitter 12 and/or 112 in one or both devices to begin transmitting optical signals modulated with data to be transferred through the high data throughput optical link formed by the two wave guides 20 and 120, in accordance with example embodiments of the invention. The wireless powering circuit 806' and the wireless powered circuit 820' may provide a higher level of wireless power above the 150 mW available from standard NFC circuitry.

Wireless powering uses contact-less electromagnetic induction. A power source circuit in a wireless powering device drives a resonant frequency circuit that produces a source alternating current in a frequency range for example between 50 kHz and 20 MHz, which is driven through a transmitting coil in the powering device. The alternating magnetic field produced by the transmitting coil inductively couples with a corresponding receiving coil in the wirelessly powered device, thereby producing a corresponding induced alternating current that drives a circuit at its resonant frequency in the range for example between 50 kHz and 20 MHz to produce an output AC voltage. A conversion circuit in the wirelessly powered device, uses a transformer to adjust the output AC voltage, an alternating-to-direct current converter, and appropriate battery monitoring and powering circuits to produce an appropriate DC powering voltage for operations in the other powered device and its rechargeable battery, if any.

Figure 9:
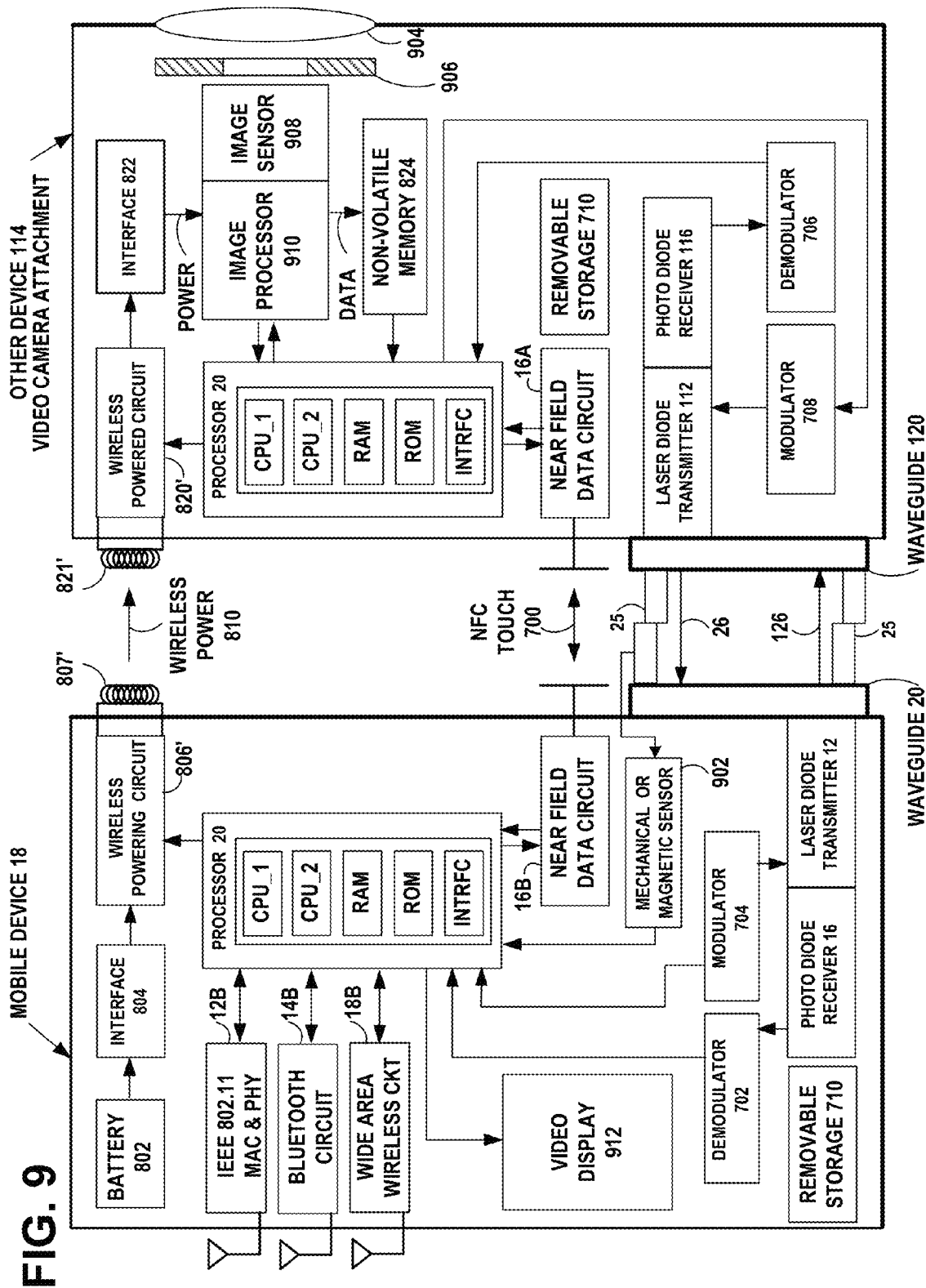
FIG. 9 is an example functional block diagram of the mobile radio device having the first slab-shaped optical waveguide mounted thereon and a wireless powering circuit and the other device, being a video camera attachment, having the second slab-shaped optical waveguide mounted thereon and a wireless powered circuit, the mobile device further including a mechanical or magnetic sensor in addition to or instead of the NFC circuits, which generate a triggering signal when the video camera attachment is connected to the host, mobile radio device, the triggering signal causing the diode laser transmitter in one or both of the mobile radio device and the video camera attachment to begin transmitting optical signals modulated with data to be transferred through the high data throughput optical link, in accordance with example embodiments of the invention.

FIG. 9 is an example functional block diagram of the mobile radio device 18 having the first slab-shaped optical waveguide 20 mounted thereon and a wireless powering circuit 806' and the other device 114, being an accessory, such as a video camera attachment, having the second slab-shaped optical waveguide 120 mounted thereon and a wireless powered circuit 820'. The host, mobile device further includes a mechanical or magnetic sensor 902 the is activated by mechanically connecting the video camera attachment 114 to the mobile radio device. The video camera attachment 114 may have a mechanical fastener 25 that mechanically couples to a corresponding mechanical fastener or, such as a socket, in the housing of the host, mobile radio device 18. The mechanical or magnetic sensor 902 may be in addition to or instead of the NFC circuits 16A and 16B. The mechanical or magnetic sensor 902 may generate a triggering signal when the video camera attachment 114 is mechanically connected to the host, mobile radio device 18. The triggering signal causes the diode laser transmitter 12 and/or 112 in one or both of the host, mobile radio device 18 and/or the video camera attachment 114 to begin transmitting optical signals modulated with data to be transferred through the high data throughput optical link formed by the two wave guides 20 and 120, in accordance with example embodiments of the invention. The wireless powering circuit 806' and the wireless powered circuit 820' may provide a higher level of wireless power above the 150 mW available from standard NFC circuitry.

The wireless power 810 transmitted by wireless powering circuit 806' in the host, mobile radio device 18 and received by the wireless powered circuit 820' in the video camera attachment 114, may be applied through the interface 822 to the image sensor 908 and the image processor 910 of the video camera attachment 114. Light from a subject scene passes through the lens 904 and the aperture 906 to illuminate the image sensor 908. The image sensor may output data streams corresponding to consecutive picture frame images of the scene. The image processor 910 may then format the data streams from the image sensor 908, for example compressing the consecutive picture frame images in accordance with the MPEG video compression standard. The MPEG video data stream may then be buffered in the non-volatile memory 824, for downloading to the host, mobile device 18 via the high data throughput optical communication link provided by the optical waveguide 20 and optical waveguide 120. Access may be provided to controller 20 and high speed bus of the host, mobile radio device 18. The MPEG video data stream may then be viewed on the display 912 of the host, mobile radio device 18. The host, mobile radio device 18 may provide control signals via the NFC circuits 16A and 16B and/or the high data throughput optical link formed by the two wave guides 20 and 120, to the video camera attachment 114, such as zoom of the optics. In this manner the video camera attachment 114 may be used as if it were hardwired to the mobile radio device 18.

FIG. 10A is an example flow diagram 1000 of operational steps in the mobile device 18 of FIG. 9, according to an embodiment of the present invention. The steps of the flow diagram may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 1002: positioning, by a guide portion configured to releasably engage another apparatus, an optical waveguide with respect to the other apparatus, to receive at a light receiving portion of the optical waveguide, optical signals from the other apparatus, modulated with high frequency data, for delivery to a high frequency optical receiver;

Step 1004: transmitting, by a wireless powering circuit, wireless power to the other apparatus, to energize a source of the optical signals modulated with high frequency data to be received by the optical wave guide; and Step 1006: transferring, by the optical waveguide, optical signals modulated with high frequency data received from the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver.

The operational steps in the mobile device 18 of FIG. 9, may further include:

generating, by a proximity detector, a triggering signal when the guide portion is releasably engaged with the other apparatus, to cause the wireless powering circuit to transmit wireless power to the other apparatus.

FIG. 10B is an example flow diagram 1050 of operational steps in the other device 114 of FIG. 9, according to an embodiment of the present invention. The steps of the flow diagram may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 1052: positioning, by a guide portion configured to releasably engage another apparatus, an optical waveguide with respect to the other apparatus, to receive at a light receiving portion of the optical waveguide, optical signals from the other apparatus, modulated with high frequency data, for delivery to a high frequency optical receiver;

Step 1054: receiving, by a wireless powered circuit, wireless power from the other apparatus, to energize a data utilization device to use the high frequency data received by the optical wave guide; and Step 1056: transferring, by the optical waveguide, optical signals modulated with high frequency data received from the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver, to provide the high frequency data to the utilization device.

The operational steps in the other device 114 of FIG. 9 may further include:

generating, by a proximity detector, a triggering signal when the guide portion is releasably engaged with the other apparatus, to cause the wireless powered circuit to receive wireless power from the other apparatus.

FIG. 11 illustrates an example embodiment of the invention, wherein examples of removable storage media 710 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In alternate example embodiments of the invention, RFID transponders may be used in devices 18 and 114, which may be the passive type or the active type, instead of the NFC transponders. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless device A and device B and the user brings the RFID transponder on the device A close to an RFID reader circuit in device B to allow near field communication between the devices. In example embodiments, both devices A and B may have RFID reader circuits to read RFID signals from the other device.

In an example embodiment, the wireless transceiver carrier in devices 18 and 114 may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693.

An example of the Near Field Communication (NFC) out-of-band short-range carrier is described, for example, in ISO/IEC 14443 and ISO/IEC 18092.

An example of the Infrared Data Association (IrDA) out-of-band short-range carrier is described, for example, in IrDA Link Access Protocol, v1.1 (1996).

An example of the Ultra Wide Band (UWB) out-of-band short-range carrier is described, for example, in WiMedia Common Radio Platform Specification, Version 1.5 (2010).

In example embodiments, the wireless transceiver carrier in devices 18 and 114 may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols include digital enhanced cordless telecommunications (DECT) and HIPERLAN. Wide Area (WAN) communications protocols include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
   a high frequency optical receiver configured to receive optical signals modulated with high frequency data;
   an optical waveguide having a light receiving portion and a light transmitting portion juxtaposed with the high frequency optical receiver, configured to transfer optical signals modulated with high frequency data incident on the light receiving portion, from the light receiving portion to the light transmitting portion, and to transmit the optical signals modulated with high frequency data to the high frequency optical receiver;
   a guide portion configured to releasably align the optical waveguide with a second optical waveguide associated with another apparatus, for positioning the optical waveguide with respect to the second optical waveguide, to receive at the light receiving portion of the optical waveguide, optical signals from the second optical waveguide, modulated with high frequency data, for delivery to the high frequency optical receiver; and
   a wireless power circuit configured to exchange wireless operating power with the other apparatus, for wireless charging to convert between electrical signals modulated with high frequency data and the optical signals modulated with high frequency data received by the optical waveguide from the second optical waveguide.

2. The apparatus of claim 1, wherein the wireless power circuit is a wireless powering circuit configured to transmit wireless power to the other apparatus, to energize a source of the optical signals modulated with high frequency data received by the optical wave guide from the second optical waveguide.

3. The apparatus of claim 1, further including:
   a data utilization device in the apparatus; and
   wherein the wireless power circuit is a wireless powered circuit configured to receive wireless power from the other apparatus, to energize the data utilization device to use the high frequency data that modulates the optical signals received by the optical wave guide from the second optical waveguide.

4. The apparatus of claim 1, further comprising:
   a proximity detector coupled to the wireless power circuit, configured to generate a triggering signal when the apparatus and the other apparatus are brought within proximity of each other;
   wherein the triggering signal causes the wireless power circuit to exchange wireless power to the other apparatus.

5. The apparatus of claim 1, further comprising:
   a proximity detector coupled to the guide portion and to the wireless power circuit, configured to generate a triggering signal when the guide portion is releasably aligned with the second optical waveguide of the other apparatus;
   wherein the triggering signal causes the wireless power circuit to exchange wireless power to the other apparatus.

6. The apparatus of claim 1, wherein the guide portion positioning the waveguide comprises at least one of magnets, adhesive, and mechanical guides.

7. The apparatus of claim 1, wherein the other apparatus comprises at least one of a stationary device, a mobile device, a mobile radio device, a display device, a storage device, an accessory device, and an attachment device.

8. A method, comprising:
   positioning, by a guide portion configured to releasably align an optical waveguide associated with an apparatus with a second optical waveguide associated with another apparatus, to receive at a light receiving portion of the optical waveguide, optical signals from the second optical waveguide associated with the other apparatus, modulated with high frequency data, for delivery to a high frequency optical receiver;
   transmitting, by a wireless powering circuit, wireless operating power to the other apparatus, for wireless charging to energize a source of the optical signals modulated with high frequency data to be received by the optical wave guide from the second optical waveguide; and
   transferring, by the optical waveguide, optical signals modulated with high frequency data received from the second optical waveguide associated with the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver.

9. The method of claim 8, further comprising:
   generating, by a proximity detector, a triggering signal when the guide portion is releasably aligned with the second optical waveguide associated with the other apparatus, to cause the wireless powering circuit to transmit wireless power to the other apparatus.

10. A method, comprising:
    positioning, by a guide portion configured to releasably align an optical waveguide associated with an apparatus with a second optical waveguide associated with another apparatus, to receive at a light receiving portion of the optical waveguide, optical signals from the second optical waveguide associated with the other apparatus, modulated with high frequency data, for delivery to a high frequency optical receiver;
    receiving, by a wireless powered circuit, wireless operating power from the other apparatus, for wireless charging to energize a data utilization device to use the high frequency data received by the optical wave guide from the second optical waveguide; and
    transferring, by the optical waveguide, optical signals modulated with high frequency data received from the second optical waveguide associated with the other apparatus and incident on the light receiving portion of the optical wave guide, the optical signals transferred from the light receiving portion to a light transmitting portion of the optical wave guide, and transmitting the optical signals modulated with high frequency data to the high frequency optical receiver, to provide the high frequency data to the utilization device.

11. The method of claim 10, further comprising:
    generating, by a proximity detector, a triggering signal when the guide portion is releasably aligned with the second optical waveguide associated with the other apparatus, to cause the wireless powered circuit to receive wireless power from the other apparatus.

* * * * *